United States Patent
Okuyama et al.

[11] Patent Number: 6,071,607
[45] Date of Patent: Jun. 6, 2000

[54] MAGNETIC RECORDING MEDIUM AND MAGNETIC DISK DEVICE

[75] Inventors: Chiaki Okuyama; Kenji Sato; Iwao Okamoto; Masayoshi Shinohara, all of Kawasaki, Japan

[73] Assignee: Fujitsu Limited, Kawasaki, Japan

[21] Appl. No.: 08/797,685

[22] Filed: Jan. 31, 1997

[30] Foreign Application Priority Data

Apr. 26, 1996 [JP] Japan .................... 8-107678

[51] Int. Cl.$^7$ .................................. G11B 5/66
[52] U.S. Cl. ............. 428/332; 428/336; 428/694 T; 428/694 TS; 428/694 TP; 428/694 TM; 428/900; 204/192.2
[58] Field of Search ............ 428/694 T, 694 TS, 428/694 TP, 694 TM, 900, 332, 336; 204/192.2

[56] References Cited

U.S. PATENT DOCUMENTS

| | | | |
|---|---|---|---|
| 4,749,628 | 6/1988 | Ahlert | 428/660 |
| 5,004,652 | 4/1991 | Lal | 428/611 |
| 5,523,173 | 6/1996 | Doerner | 428/611 |

FOREIGN PATENT DOCUMENTS

| | | |
|---|---|---|
| 1256017 | 12/1983 | Japan . |
| 1256017 | 10/1989 | Japan . |
| 572016 | 10/1993 | Japan . |
| 644548 | 2/1994 | Japan . |
| 6309647 | 11/1994 | Japan . |
| 750008 | 2/1995 | Japan . |
| 750009 | 2/1995 | Japan . |
| 765348 | 3/1995 | Japan . |

*Primary Examiner*—Leszek Kiliman
*Attorney, Agent, or Firm*—Greer, Burns & Crain, Ltd.

[57] ABSTRACT

A magnetic recording medium comprising a nonmagnetic substrate and a magnetic recording film of a magnetic metal material deposited through a primer layer of a nonmagnetic metal material on the substrate, wherein the primer layer is formed of a metallic material composed mainly of chromium or chromium and molybdenum and the magnetic recording film is formed of a metallic material composed mainly of at least one member selected from the group consisting of cobalt, chromium, tantalum, and platinum. The magnetic recording medium enables high-density recording by taking advantage of high coercive force and, at the same time, can reduce the noise level and improve the S/N ratio.

25 Claims, 20 Drawing Sheets

MAGNETIC RECORDING MEDIUM AND MAGNETIC DISK DEVICE

BACKGROUND OF THE INVENTION

1. Field of the Invention

The present invention relates to a magnetic recording medium and more particularly to a magnetic recording medium which enables high-density recording by virtue of high coercive force and has reduced noise and an improved S/N ratio. Further, the present invention relates to a magnetic recording medium which has been improved in S/N ratio by improving the reproducing output while maintaining the low noise level. Furthermore, the present invention relates to a magnetic recording medium wherein, even when a CrMo film is directly deposited as a primer layer on a substrate, the growth of CrMo grains is not influenced by the surface state of the substrate and, hence, the crystallographic orientation of (100) plane of the primer layer does not undergo any change. Furthermore, the present invention relates to magnetic disk devices, for recording and reproducing information, using the above magnetic recording media, particularly magnetoresistive heads.

2. Description of Related Art

The development of information processing techniques has led to an increasing demand for an increase in density of magnetic disk devices used in external storage devices for computers. Specifically, in the reproducing head of the magnetic disk devices, the use of a magnetoresistive head utilizing a magnetoresistor, wherein the electric resistance changes in response to the magnetic field intensity, that is, MR head, instead of the conventional wound-type inductive thin film magnetic head has been proposed in the art. The MR head has applied magnetoresistance, that is, the change in electric resistance produced in a magnetic material on application of an external magnetic field, to the reproduction of a signal on a recording medium and has features including a reproduction output margin that is several times larger than that in the case of the conventional inductive thin film magnetic head, a small inductance and a large S/N ratio. Further, the use of an AMR (anisotropic magnetoresistive) head utilizing anisotropic magnetoresistance, a GMR (giant magnetoresistive) head utilizing giant magnetoresistance, and a spin valve GMR head of a practical type, besides the MR head, have also been proposed.

Further, in order to meet the demand for high-density recording, a sufficient improvement in properties to cope with the above MR head, AMR head, or GMR head (including spin valve head) has been demanded in the magnetic recording medium. In particular, low tBr (a product of the thickness t and the residual magnetic flux density Br of a magnetic recording film), low noise, and high coercive force Hc are required of the magnetic recording medium. In order to meet such requirements, the prior art, for example, Japanese Unexamined Patent Publication (Kokai) No. 1-256017 discloses a magnetic recording medium comprising a nonmagnetic substrate, a chromium layer (thickness=100 nm) deposited as a primer film on the nonmagnetic substrate, and a magnetic layer (thickness=60 nm) deposited on the chromium layer, the magnetic layer being formed of a CoCrTaPt-base four-component alloy and having a combination of low noise derived from CoCrTa-base alloy with high coercive force derived from CoCrPt-base alloy. The film is deposited by sputtering under the conditions of a substrate heating temperature of 200° C. and an Ar gas pressure of 5 mTorr. According to this invention, the content of expensive Pt can be reduced, and, in addition, a high coercive force of about 1700 Oe and satisfactory saturation magnetization of a magnetic recording medium can also be realized.

U.S. Pat. No. 5,004,652 (corres. to Japanese Unexamined Patent Publication (Kokai) No. 4-228105) discloses a magnetic recording medium comprising a nonmagnetic substrate and a chromium layer (thickness=about 30–300 nm) and a magnetic layer of a CoCrPtTa four-component alloy (thickness=about 20–100 nm) deposited in that order by sputtering on the nonmagnetic substrate. The sputtering is carried out under Ar gas at a pressure of 5 to 20 mTorr. According to this invention, a high coercive force exceeding 1800 Oe, high resolution, output and loop squareness ratio and low bit shift value can be provided.

Further, Japanese Unexamined Patent Publication (Kokai) No. 5-72016 discloses a process for producing a magnetic recording medium, wherein a magnetic metallic thin film is deposited on a substrate by sputtering. This production process is characterized by comprising the steps of: providing an intermediate electrode in the vicinity of the outer periphery of a target; applying a positive potential of +50 to +500 V to the electrode with respect to a ground portion of a film forming device body with a negative bias voltage of −50 to −500 V applied to the substrate; and, in this state, forming a magnetic metallic thin film composed mainly of cobalt. The magnetic recording medium thus obtained comprises a nonmagnetic substrate and a magnetic layer (tBr= 400 G.$\mu$m) of a CoCrTa three-component alloy deposited through a chromium layer (thickness=200 nm) on the nonmagnetic substrate. According to this invention, a high coercive force can be realized by virtue of a change in film structure in terms of crystallographic orientation, grain diameter, internal stress and the like.

The above prior art teaches useful means for enhancing the coercive force of a magnetic recording medium. However, no consideration is given to a reduction in noise which is one of the objects of the present invention.

Japanese Unexamined Patent Publication (Kokai) No. 7-50008 teaches a magnetic recording medium which can simultaneously satisfies both property requirements, high coercive force and low noise. Specifically, the magnetic recording medium taught in this publication comprises a nonmagnetic substrate layer and a magnetic layer deposited through a nonmagnetic metal primer layer (thickness= 10–300 nm) of chromium or a chromium alloy on the nonmagnetic substrate layer, the magnetic layer being formed of an alloy containing Co, Cr, Pt, and at least one member selected from the group consisting of Nb, Hf, W, Ti, and Ta. According to this invention, not only a high coercive force of 1610 to 1750 Oe (Examples 1 to 7) but also low noise can be achieved. Japanese Unexamined Patent Publication (Kokai) No. 7-50009 discloses a magnetic recording medium wherein a thin film medium of an alloy of 95 to 60 at % Cr and 5 to 40 at % of at least one member selected from Mo and W is used as a primer layer for a magnetic film having a single layer structure of a CoCrPt alloy. This magnetic recording medium also can realize, simultaneously, high coercive force and low noise. Specifically, the use of a Cr layer containing 28 at % Mo as the primer layer results in about 10% reduction in noise as compared with a primer layer consisting of Cr alone. In the techniques taught in these publications, however, tBr is not less than 270 G.$\mu$m, rendering these techniques unsatisfactory for the higher density recording expected in the future.

Japanese Unexamined Patent Publication (Kokai) No. 6-309647 discloses a magnetic recording medium comprising a glass substrate, a precoat provided on the glass substrate, and a primer film of Cr and a magnetic film of a Co—Cr—Ta—Pt four-component alloy provided on the precoat. In this magnetic recording medium, conditions for the formation of the precoat, the primer film, and the magnetic film are controlled to regulate the relative direction between the lattice face of grown Cr and Co crystals and the glass substrate face, thereby improving the coercive force. In particular, the formation of the precoat using a material containing at least a metal selected from at least V, Mo and Ni—P permits the lattice face of Cr (110) plane to be preferentially oriented parallel to the glass substrate face, enabling high-density recording. However, the technique described in this publication also aims to improve the coercive force of the magnetic recording medium, and no mention is made of the lowering in noise level.

The conventional magnetic recording media will be further examined. As described above, the composition of the primer film underlying the magnetic recording film is selected so as to provide satisfactory coercive force and suitable residual magnetization value, and, further, in order to lower the noise level, a multi-layer structure is adopted in the magnetic recording film from the viewpoint of the necessity of reducing the diameter of magnetic particles. For example, Japanese Unexamined Patent Publication (Kokai) No. 6-44548 discloses a magnetic recording medium comprising a nonmagnetic substrate, a plurality of magnetic layers provided on the nonmagnetic substrate, and a nonmagnetic intermediate layer disposed between the magnetic layers, wherein the magnetic layers are different from each other or one another in thickness and identical to each other or one another in the product of the residual magnetization value and the thickness. In this magnetic recording medium, an alloy, comprising Cr, Mo, W, Ta, Nb as a main component and additives, i.e., Ti, Si, Fe, V, Ge, Cu, Pt, Rh, Ru, Re, is used in the intermediate layer for separating the magnetic layers from each other and the primer layer underlying the magnetic layer to regulate the orientation and grain diameter of the magnetic layer, thereby improving the properties of the magnetic recording medium. A Cr layer containing 5 at % Mo and the like may be exemplified as a suitable primer layer.

The present inventors have noticed that the use of CrMo as the primer layer for the magnetic recording medium offers good results, and they have investigated magnetostatic properties and electromagnetic conversion properties in the case where CrMo is used as the primer layer in the magnetic recording media described in Japanese Unexamined Patent Publication (Kokai) No. 6-44548 and Japanese Unexamined Patent Publication (Kokai) No. 7-50009 noted above. As a result, they have found that such magnetic recording media cannot provide satisfactory properties at a recording density (or not less than 1 Gb/in$^2$) which is currently required in the art. That is, it was found that a recording medium having a higher reproduction output than the conventional recording medium while maintaining the low noise level is necessary. Such a requirement cannot be satisfied even by the recording medium having a magnetic layer of CoCrTaPt four-component alloy described in Japanese Unexamined Patent Publication (Kokai) No. 1-256017 noted above.

Further, regarding a magnetic recording medium, it is known that, when the pulse width of a reproduced waveform is Pw50, the following relationship exists between magnetic properties, coercive force Hc, residual magnetization Mr, and thickness t of the magnetic layer:

$$Pw50 \propto (t \times Mr/Hc)^{1/2}$$

Generally, a narrower pulse width of the reproduced waveform is more suitable for a high-density recording medium. Therefore, in the case of a magnetic recording medium capable of conducting high-density recording, it is preferred that the thickness of the magnetic film is as thin as possible while creating the highest possible coercive force. In general, however, a requirement for a reduction in thickness of the magnetic film is contradictory to a requirement for an enhancement in coercive force. For example, a reduction in the thickness of the magnetic film to not more than about 20 nm is likely to result in lowered coercive force. Further, as described above, practical use of the MR head having a high sensitivity has led to an increasing demand for lower noise of the medium. Rough surface of the substrate, uneven diameter of magnetic particles, turbulence of a transient region due to magnetic interaction among magnetic particles and the like are considered as causes of the noise of the medium.

In the case of magnetic recording media having a magnetic layer comprising a CoCr alloy, among the magnetic recording media currently known in the art, the coercive force can be improved by varying the Cr content of the alloy constituting the magnetic layer or adding a suitable amount of Pt or the like. Increasing the Cr concentration of the CoCr alloy leads to an enhancement in magnetic isolation of the magnetic particles and, hence, is effective also in reducing the noise level of the medium.

Further, in the case of a CoCr-based in-plane magnetic recording medium, preferably, the axis of easy magnetization (C-axis) of the magnetic film is oriented within the plane as much as possible. In the case of the magnetic recording media in current use, the formation of a primer layer of Cr just under the magnetic film is used as means for realizing in-plane orientation of the axis of easy magnetization (C-axis) of the magnetic film. This relies upon the fact that, crystallographically, a plane parallel to the C-axis of a magnetic film comprising a Co alloy is likely to orient on the Cr (100) plane. In particular, in Japanese Unexamined Patent Publication (Kokai) No. 7-50009 noted above, an improvement in in-plane orientation of the magnetic film in addition to high coercive force and low noise level is attained by the addition of at least one member selected from Mo and W to the primer layer of Cr. Further, in Japanese Unexamined Patent Publication (Kokai) No. 7-65348, a nucleation control layer constituted by an amorphous thin film of at least one member selected from Si, Ge, C, and B is interposed between the substrate and a thin film for control of the structure (primer layer of CrMo alloy or the like) to facilitate the regulation of the grain diameter and the in-plane orientation of the magnetic thin film of a Co-based alloy provided on the thin film for control of the structure, resulting in the provision of a magnetic film having a suitable diameter of magnetically isolated particles effective in realizing improved magnetic properties such as high coercive force.

The problems of the above magnetic recording media will be summarized. The addition of an element having a large atomic radius, such as Pt, to a magnetic layer comprising a Co alloy, including a magnetic layer comprising a CoCr alloy, for enhancement of the coercive force and other purposes results in an extended crystal (hcp) lattice of Co alloy. Consequently, when Cr is used as a primer layer for the above magnetic layer comprising a Co alloy in a magnetic recording medium, it is impossible to provide matching between the crystal lattice of the magnetic layer and the Cr crystal lattice of the Cr primer layer, posing a problem that the in-plane orientation of the axis of easy magnetization is deteriorated. As described in Japanese Unexamined Patent Publication (Kokai) No. 7-50009 noted above, however, this problem can be solved by adding an additional element, such as Mo, to the Cr primer layer to increase the lattice spacing of Cr. However, the addition of Mo in an amount of, for example, 10 to 20 at %, to Cr lowers the solidifying point of the Cr crystal, causing the distance in which CrMo molecules (atoms) are moved on the substrate, that is, the mean free path, to become longer than that in the case of Cr atom alone in the course of the formation of the primer layer by sputtering. Due to this unfavorable phenomenon, in the formation of a CrMo film directly on the substrate, the growth of CrMo grains is likely to be affected by a local variation of the surface state of the substrate, for example, surface form and surface energy level of the substrate, resulting in increased tendency for the variation in the diameter of CrMo particles to be increased.

As described above, in the conventional magnetic disk devices, a magnetoresistive reproducing head has been used, and, in particular, a composite magnetic head comprising a combination of a magnetoresistive reproducing head for reading information with an induction type recording head (thin film head) for recording information, as shown in FIG. 1, has been advantageously used.

FIG. 1 is a cross-sectional view of a conventional composite magnetic head, as viewed from the magnetic recording medium layer side, showing the lamination around a recording gap. In the drawing, a nonmagnetic insulating layer 102 formed of alumina or the like, a lower shield layer 103 formed of NiFe or the like, and a nonmagnetic insulating layer 104 formed of alumina or the like are provided in that order on a ceramic head substrate 101. A magnetoresistor section 105 of a reproducing head section is provided on the nonmagnetic insulating layer 104. A pair of conductor layers 106 having a uniform thickness (in general, about 1000–1200 Å) are provided, at an interval corresponding to a recording track width, on the magnetoresistor section 105 in order to supply a sense current into the magnetoresistor section. Further, a nonmagnetic insulating layer 107 formed of alumina or the like is provided on the magnetoresistor section 105 and the conductor layer 106, and a recording head section is provided thereon. Specifically, a lower magnetic pole (an upper shield layer) 108 formed of NiFe or the like, a coil (not shown), a nonmagnetic insulating layer 109 formed of alumina or the like, and an upper magnetic pole 110 formed of NiFe or the like are provided in that order. Finally, a protective layer 111 formed of alumina or the like is provided on the outside of the upper magnetic pole 110 in order to cover the surface of the recording head section.

However, in a magnetic head having the above construction, due to the presence of the conductor layers 106 provided while leaving a space therebetween, layers overlying the conductor layers 106 become wavy. In particular, curving of the lower magnetic pole (upper shield layer) 108 located near the conductor layers 106 is significant. Curving of the magnetic poles 108 and 110 results in curving of recording gap, of the magnetic recording medium, facing the magnetic poles. This causes a recording form (a magnetic pattern) at the end of the recording gap on the magnetic recording medium to be considerably distorted. When the position, on a track, of the magnetic head at the time of information recording is different from the position, on the track, of the magnetic head at the time of reading of the information, the reproducing head section reads also information recorded on the end of the recording gap on the magnetic recording medium, making it impossible for the magnetic disk device to accurately read the contemplated information. Thus, this type of magnetic head, despite small off-track, causes a problem of reading errors.

Reducing the thickness of the conductor layer 106 is considered effective for solving the above problem. Reducing the thickness of the conductor layer 106 results in increased resistance of the layer and, hence, increases the voltage drop in this layer, making it difficult to detect, in high sensitivity, a change in resistance in the magnetoresistor. This poses a new problem of a deteriorated S/N ratio. Further, generation of heat in the conductor layer 106 poses an additional new problem of a creation of noise.

SUMMARY OF THE INVENTION

A first object of the present invention is to provide an improved magnetic recording medium which simultaneously attains two effects, which are very difficult to attain, that is, a high coercive force and a low noise level.

A second object of the present invention is to provide a magnetic recording medium having coercive force high enough to provide high reproduction output and, at the same time, capable of lowering the noise level, and a magnetic recording medium which can improve the reproduction output while maintaining the low noise level, thereby improving the S/N ratio.

A third object of the present invention is to provide a magnetic recording medium which, even when a CrMo film is provided directly on a substrate, can avoid the influence of the surface state of the substrate on the growth of CrMo grains, permitting the crystallographic orientation of (100) plane of the primer layer to undergo no change.

A fourth object of the present invention is to provide magnetic disk devices using the above magnetic recording media according to the present invention.

Other objects of the present invention will be easily understood from the following detailed description of the present invention.

The above objects can be attained by a magnetic recording medium comprising a nonmagnetic substrate and a magnetic recording film of a magnetic metal material provided through a primer layer of a nonmagnetic metal material on the substrate, wherein the primer layer is formed of a metallic material composed mainly of chromium or composed mainly of chromium and molybdenum and the magnetic recording film is formed of a metallic material composed mainly of at least one member selected from the group consisting of cobalt, chromium, tantalum, and platinum.

In one aspect of the present invention, the magnetic recording film of the magnetic recording medium comprises a four-component alloy of chromium, tantalum, platinum, and cobalt, the four-component alloy having any one of the following compositions (A) to (D):

Composition (A):
  chromium: 14 to 25 at %,
  tantalum: 1 to 7.5 at %,
  platinum: 2 to 20 at %, and
  cobalt: balance;
Composition (B):
  chromium: 14 to 25 at %,
  tantalum: 1 to 7.5 at %,
  platinum: 4 to 15 at %, and
  cobalt: balance;

Composition (C):
  chromium: 15.5 to 23.5 at %,
  tantalum: 1 to 7.5 at %,
  platinum: 4 to 17 at %, and
  cobalt: balance; and
Composition (D):
  chromium: 16.5 to 22 at %,
  tantalum: 1 to 3 at %,
  platinum: 2 to 20 at %, and
  cobalt: balance.

In another aspect of the present invention, the magnetic recording film of the magnetic recording medium is a film having a multi-layer structure comprising two or more mutually separated magnetic layers formed through a nonmagnetic intermediate film interposed between the respective two magnetic layers.

In a further aspect of the present invention, the primer layer of the magnetic recording medium is formed of an alloy comprising 10 to 30 at % of molybdenum with the balance consisting of chromium and the magnetic recording film overlying the primer layer is a film having a multi-layer structure comprising two or more mutually separated magnetic layers formed through a nonmagnetic intermediate film interposed between respective two magnetic layers, the magnetic layers each being formed of a metallic material comprising cobalt and chromium as main components and, as additional components, 4 to 10 at % of platinum and 5 at % or less of at least one member selected from the group consisting of boron, tantalum, and niobium, the total thickness of the magnetic layers being not more than 30 nm.

In still another aspect of the present invention, an additional primer layer formed of titanium is interposed between the substrate of the magnetic recording medium and the overlying primer layer, the additional primer layer having such a thickness will not change the (100) plane orientation of the primer layer.

According to another aspect of the present invention, there is provided a magnetic disk device comprising a recording head section for recording information in a magnetic recording medium and a reproducing head section for reproducing information, wherein the magnetic recording medium is a magnetic recording medium of the present invention described above and described below in detail and the reproducing head section is provided with a magnetoresistive head, i.e., MR head.

DESCRIPTION OF THE PREFERRED EMBODIMENTS

Figure 2:
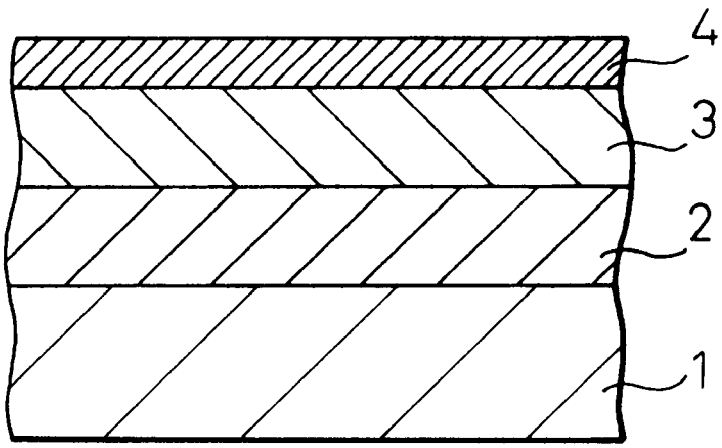
FIG. 2 is a cross-sectional view showing one preferred embodiment of the magnetic recording medium according to the present invention.

As shown in FIG. 2, the magnetic recording medium according to the present invention comprises a nonmagnetic substrate 1 and a magnetic recording film 3 of a magnetic metal material deposited through a primer layer 2 of a nonmagnetic metal material on the substrate 1. As will be described below, various preferred embodiments are possible for the magnetic recording medium. In FIG. 2, a protective film 4, which may be optionally provided in the present invention, is provided on the magnetic recording film 3.

In the magnetic recording medium according to the present invention, basically, the nonmagnetic primer layer on the nonmagnetic substrate is deposited of a metallic material composed mainly of chromium or composed mainly of chromium and molybdenum, and the magnetic recording film on the primer layer is deposited of a metallic material composed mainly of at least one member selected from the group consisting of cobalt, chromium, tantalum, and platinum.

In one embodiment of the magnetic recording medium according to the present invention, the magnetic recording film of the magnetic recording medium comprises a four-component alloy of chromium, tantalum, platinum, and cobalt, the four-component alloy having any one of the following compositions (A) to (D):

Composition (A):
chromium: 14 to 25 at %,
tantalum: 1 to 7.5 at %,
platinum: 2 to 20 at %, and
cobalt: balance;
Composition (B):
chromium: 14 to 25 at %,
tantalum: 1 to 7.5 at %,
platinum: 4 to 15 at %, and
cobalt: balance;
Composition (C):
chromium: 15.5 to 23.5 at %,
tantalum: 1 to 7.5 at %,
platinum: 4 to 17 at %, and
cobalt: balance; and
Composition (D):
chromium: 16.5 to 22 at %,
tantalum: 1 to 3 at %,
platinum: 2 to 20 at %, and
cobalt: balance.

In the magnetic recording medium of the present invention, preferably, the magnetic recording film formed of the above four-component alloy has been deposited by sputtering under the application of a DC negative bias of not less than 200 V, has a tBr (film thickness×residual magnetic flux density) of not more than 120 G.μm, and a thickness t of not more than 30 nm, and, preferably, the primer layer underlying the magnetic recording film has a thickness of not more than 30 nm.

The present inventors have surprisingly found that when a magnetic recording medium is constructed as described above and, in particular, when the magnetic recording film is deposited under specific sputtering conditions, a high S/N ratio and a high coercive force can be simultaneously attained. The reason why a high S/N ratio and a high coercive force can be simultaneously attained is as follows. Introduction of Cr in a high concentration and a suitable Ta content and, at the same time, the application of strong bias and high substrate temperature at the time of the deposition of the film by sputtering to facilitate the migration of Cr within the recording film magnetically isolates magnetic particles within the recording film, offering low noise level, and suitable Pt content and film deposition conditions offer satisfactory coercive force. A higher Cr content of the alloy is preferred from the viewpoint of reducing the noise level. However, as described above in the "Description of Related Art", when the Cr content of the alloy exceeds 20 at %, the coercive force is lowered, rendering the magnetic recording medium unsuitable for practical use. The present inventors have solved such a problem by combining the regulation of the composition of the alloy and the regulation of film deposition conditions, which has led to the provision of excellent magnetic properties.

This will be described in more detail. In the magnetic recording medium of the present invention, the nonmagnetic substrate may be made of various substrate materials commonly used in the art. Suitable substrate materials include, but not limited to, for example, NiP-plated aluminum (including aluminum alloy) disks, glass or reinforced glass disks, silicon disks having a surface oxide film (for example, a silicon oxide film), SiC disks, carbon disks, plastic disks, and ceramic disks.

The primer layer provided on the nonmagnetic substrate may be any one commonly adopted in the art and, in particular, may be formed of a metallic material composed mainly of chromium or a metallic material composed mainly of chromium and molybdenum. For example, when the magnetic layer contains platinum, the primer layer may be deposited of preferably a metallic material composed mainly of chromium and molybdenum. Suitable materials for the primer layer include, for example, Cr, CrW, CrV, CrTi, and CrMo. Preferably, such a primer layer may be deposited, for example, by sputtering, such as magnetron sputtering, under film deposition conditions commonly used in the art. Suitable film deposition conditions are, for example, a substrate temperature of about 100–300° C., an Ar gas pressure of about 1–10 mTorr, and a bias voltage of about 100–300 V. If necessary, instead of sputtering, other film deposition methods, for example, vapor deposition and ion beam sputtering, may be used. The thickness of the primer layer may vary widely depending upon various factors. It, however, is preferably not more than 30 nm. Although the lower limit of the primer layer is not particularly limited, it is generally about 2 or 3 nm to 10 nm.

As described above, the magnetic recording film deposited through the primer layer on the nonmagnetic substrate is formed of a CoCrTaPt four-component alloy. Preferably, such a magnetic recording film may be advantageously deposited by sputtering under specific film deposition conditions. As in the deposition of the primer layer, sputtering may be, for example, magnetron sputtering. Suitable film deposition conditions are, for example, a substrate temperature of about 100–300° C., an Ar gas pressure of about 1–10 mTorr, and a bias voltage of about 100–300 V. If necessary, instead of sputtering, other film deposition methods, for example, vapor deposition and ion beam sputtering, may be used. According to the present inventors' finding, in practicing the present invention, optimal film forming conditions may be selected for each selected substrate. For example, when the nonmagnetic substrate is a NiP-plated aluminum disk, the magnetic recording film may be advantageously deposited from chromium, tantalum, platinum, and cobalt by sputtering at a substrate temperature of 280 to 320° C. Further, when the nonmagnetic substrate is a glass disk, the magnetic recording film may be advantageously deposited from chromium, tantalum, platinum, and cobalt by sputtering at a substrate temperature of 280 to 400° C. Furthermore, when the nonmagnetic substrate is a silicon disk having a surface oxide film (for example, a silicon oxide film), the magnetic recording film may be advantageously deposited from chromium, tantalum, platinum, and cobalt by sputtering at a substrate temperature of 280 to 1200° C.

The deposition of the magnetic recording film will be further described. In the magnetic recording medium of the present invention, the magnetic recording film included therein may be a film having a single layer structure or alternatively, as described below in detail, may be a film having a multi-layer structure of two or more mutually separated magnetic layers. That is, the magnetic recording film may optionally take a multi-layer structure. In this case, the magnetic layers may be separated from each other through a nonmagnetic intermediate film interposed between the respective two magnetic layers. Suitable nonmagnetic intermediate films include, for example, a CrMo layer which will be described below.

If necessary, the magnetic recording medium of the present invention may further comprise, as the outermost layer and usually on the above magnetic recording film, a protective film frequently adopted in the art. Suitable protective films include, for example, a layer consisting of carbon alone and layers of carbon compounds, for example, C layer, WC layer, SiC layer, $B_4C$ layer, and hydrogen-containing carbon (C) layer. In particular, a protective film of carbon can be advantageously used in the practice of the present invention. The above protective film may be deposited by the conventional method, for example, by sputtering or vapor deposition. The thickness of the protective film may vary widely depending upon various factors. It, however, is preferably about 5 to 15 nm.

Further, in the magnetic recording medium of the present invention, an additional primer layer composed mainly of titanium, preferably a thin film of Ti, may be optionally provided between the nonmagnetic substrate and the overlying primer layer. The additional primer layer will be described below in detail in connection with a further embodiment of the magnetic recording medium according to the present invention.

In the magnetic recording medium of the present invention, in addition to the above-mentioned indispensable layers and optional layers, additional layers commonly used in the art may be included. Otherwise, the layers constituting the magnetic recording medium may be optionally subjected to chemical treatment or the like. For example, the protective film may have thereon a lubricant layer comprising a fluorocarbon resin or otherwise may be subjected to treatment for imparting the same effect attained by the lubricant layer.

Figure 3:
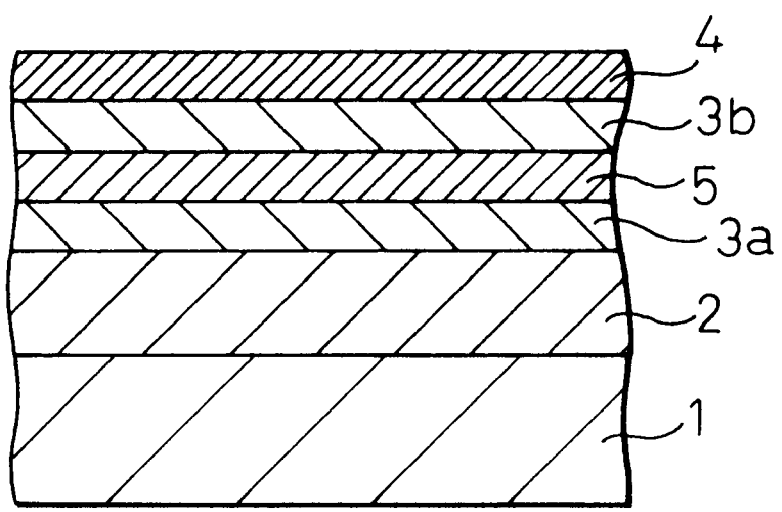
FIG. 3 is a cross-sectional view showing another preferred embodiment of the magnetic recording medium according to the present invention.

According to another embodiment of the magnetic recording medium according to the present invention, the magnetic recording film including the magnetic recording medium is deposited of, as described above, a metallic material composed mainly of at least one member selected from cobalt, chromium, tantalum, and platinum, for example, the above four-component alloy of chromium, tantalum, platinum, and cobalt, and the magnetic recording film is a film having a multi-layer structure comprising two or more mutually separated magnetic layers deposited through a nonmagnetic intermediate film interposed between the respective two magnetic layers. The construction of such a magnetic recording medium will be explained with reference to FIG. 3 which is a variation of the medium shown in FIG. 2. Specifically, in the embodiment shown in FIG. 3, the magnetic recording film 3 shown in FIG. 2 is separated into two magnetic layers, i.e., magnetic layers 3a and 3b, by a nonmagnetic intermediate film 5 interposed between these magnetic layers. Preferably, the primer layer underlying the lowermost magnetic layer constituting the magnetic recording film and the magnetic layers have been deposited by sputtering under the application of a negative bias of 100 to 300 V, and the nonmagnetic intermediate film has been deposited by sputtering without the application of any bias.

Surprisingly, the use of the magnetic recording medium of the present invention can improve the reproduction output while maintaining the low noise level and, hence, can improve the S/N ratio. As described above in the "Description of Related Art", this finding is derived from the present inventors' careful examination of the techniques described in Japanese Unexamined Patent Publication (Kokai) Nos. 6-44548, 7-50009, and 1-256017. Specifically, the present inventors have studied the composition of the CrMo alloy as a primer layer applied to a Pt-containing Co-based magnetic film, particularly a CoCrPtTa material described in Japanese Unexamined Patent Publication (Kokai) No. 1-256017 and, as a result, have found that, as compared with the conventional composition (Mo=5 at %) described in Japanese Unexamined Patent Publication (Kokai) No. 6-44548, a Mo content of not less than 10 at % offers better magnetostatic properties and electromagnetic conversion properties. In Japanese Unexamined Patent Publication (Kokai) No. 7-50009, a film having a single layer structure of $CoCr_{13}Pt_{12}$ (subscripts representing at %; the same shall apply hereinafter) is used as the magnetic film, and it has been found that it is difficult to provide satisfactory electromagnetic conversion properties by mere optimization of the composition of the CrMo primer layer and that the adoption of a multi-layer structure in the magnetic film is necessary.

The magnetic film of the magnetic recording medium according to the present invention can be divided by a nonmagnetic intermediate film into a plurality of magnetic layers, and the residual magnetization can be regulated by varying the composition, film deposition method, and film deposition conditions of the magnetic layer. In particular, when magnetron sputtering is used as the film deposition method, film deposition conditions are preferably a substrate temperature of 200° C. or above and an applied bias of about 100 to 300 V.

In the magnetic recording medium of the present invention, the nonmagnetic primer layer may be formed of preferably a CrMo alloy. The lattice spacing of CrMo may be varied by varying the content of Mo in the CrMo alloy. When the lattice spacing of the primer layer is made close to the lattice spacing of the magnetic film, by the composition of the magnetic film, particularly the Pt content thereof, a preferential areal orientation of the CoC axis of the magnetic film can be promoted. Preferably, the lattice spacing of the primer layer is about 1% wider, rather than completely uniform lattice spacing, and the Mo content is determined so that tensile stress is applied to the magnetic film. This results in further improved magnetic properties and recording density properties. Further, the thickness of the nonmagnetic primer layer is preferably 1 to 25 nm from the viewpoint of improving the S/N ratio. The formation of the primer film may be conducted in the same manner as used for the formation of the magnetic film, and the bias also may be applied in the same manner as used for the magnetic film.

As with the nonmagnetic primer layer, the nonmagnetic intermediate layer which is used to divide the magnetic film into a plurality of magnetic layers may be formed of preferably a CrMo alloy. The nonmagnetic intermediate layer may not necessarily have the same composition as the nonmagnetic primer layer. However, in order to make the lattice spacing equal to that of the overlying and underlying magnetic layers, the nonmagnetic intermediate layer preferably has a composition identical or close to the composition of the primer layer. The thickness of the nonmagnetic intermediate layer is preferably not more than 5 nm from the viewpoint of improving the S/N ratio. The intermediate layer may be formed in the same manner as used in the formation of the magnetic film, except that no bias is applied in order to avoid the deterioration of the magnetic properties of the underlying magnetic layer.

The following preferred embodiments, including the above embodiments, are embraced in the magnetic recording medium, of the present invention, having a magnetic recording film with a multi-layer structure.

1. A magnetic recording medium wherein the primer layer and the intermediate film are substantially identical to each other in the composition.

2. A magnetic recording medium wherein the primer layer and the intermediate film are each formed of a metallic material composed mainly of chromium and molybdenum and the magnetic layer constituting the magnetic recording film is formed of a metallic material composed mainly of cobalt, chromium, and platinum.

3. A magnetic recording medium wherein the primer film formed of a metallic material composed mainly of chromium and molybdenum has a molybdenum content of 10 to 30 at %.

4. A magnetic recording medium wherein the magnetic layer formed of a metallic material composed mainly of cobalt, chromium, and platinum has a thickness of not more than 15 nm and the total thickness of the magnetic layers is not more than 25 nm.

5. A magnetic recording medium wherein the primer film formed of a metallic material composed mainly of chromium and molybdenum has a thickness of not more than 30 nm.

6. A magnetic recording medium wherein the intermediate film formed of a metallic material composed mainly of chromium and molybdenum has a thickness of 1 to 10 nm.

7. A magnetic recording medium wherein the nonmagnetic substrate of the medium is a NiP-plated aluminum disk and the magnetic layer has been deposited by sputtering at a substrate temperature of 200 to 320° C.

In the magnetic recording medium of the present invention, the nonmagnetic substrate, the nonmagnetic primer layer, the magnetic recording film (magnetic layers) and the like may be constructed as generally described above and may be deposited by the above-mentioned methods and conditions, unless otherwise specified. Further, similarly, the provision of a protective film of carbon or other material and/or the provision of an additional primer layer, formed of a metallic material composed mainly of titanium, between the substrate and the overlying primer layer is possible according to need.

The use of the magnetic recording medium according to the present invention simultaneously offers a high S/N ratio and a high coercive force. The reason for this is as follows. Since the Mo content of the CrMo primer layer is increased to vary the lattice spacing and to make the lattice spacing close to the lattice spacing of the magnetic film, the orientation of the magnetic film can be improved. Further, the separation of the magnetic film by a CrMo intermediate film can refine grains, resulting in a lower noise level.

In connection with the invention directed to the above magnetic recording medium, the present inventors have further found a magnetic recording medium comprising a nonmagnetic substrate and a magnetic recording film of a magnetic metal material provided through a primer layer of a nonmagnetic metal material on the substrate, characterized in that the primer layer is formed of an alloy comprising 10 to 30 at % of molybdenum with the balance consisting of chromium and the magnetic recording film is a film having a multi-layer structure comprising two or more mutually separated magnetic layers formed through a nonmagnetic intermediate film interposed between respective two magnetic layers, the magnetic layers each being formed of a metallic material comprising cobalt and chromium as main components and, as additional components, 4 to 10 at % of platinum and 5 at % or less of at least one member selected from the group consisting of boron, tantalum, and niobium, the total thickness of the magnetic layers being not more than 30 nm.

In the magnetic film of the magnetic recording medium according to the present invention, the residual magnetization can be regulated by varying the composition, film deposition method, and film deposition conditions of the magnetic film. In particular, when magnetron sputtering is used as the film deposition method, film deposition conditions are preferably a substrate temperature of 200° C. or above and an applied bias of about 100 to 300 V.

In the magnetic recording medium of the present invention, the nonmagnetic primer layer may be formed of preferably a CrMo alloy. The lattice spacing of CrMo may be varied by varying the content of Mo in the CrMo alloy. When the lattice spacing of the primer layer is made close to the lattice spacing of the magnetic film, by changing the composition of the magnetic film, particularly the Pt content thereof, preferential areal orientation of the Co—C axis of the magnetic film can be promoted. Preferably, the lattice spacing of the primer layer is about 1% wider, rather than completely uniform lattice spacing, and the Mo content is determined so that tensile stress is applied to the magnetic film. This results in further improved magnetic properties and recording density properties. Further, the thickness of the nonmagnetic primer layer is preferably 1 to 25 nm from the viewpoint of improving the S/N ratio.

As with the nonmagnetic primer layer, the nonmagnetic intermediate layer which is used to divide the magnetic film into a plurality of magnetic layers may be preferably formed of a CrMo alloy. The nonmagnetic intermediate layer may not necessarily have the same composition as the nonmagnetic primer layer. However, in order to make the lattice spacing equal to that of the overlying and underlying magnetic layers, the nonmagnetic intermediate layer preferably has a composition identical or close to the composition of the primer layer. The thickness of the nonmagnetic intermediate layer is preferably not more than 5 nm from the viewpoint of improving the S/N ratio.

The following preferred embodiments, including the above embodiments, are embraced in the magnetic recording medium, of the present invention, having a magnetic recording film with a multi-layer structure.

1. A magnetic recording medium wherein the primer layer and the intermediate film are substantially identical to each other in composition and the intermediate layer has a thickness of 1 to 5 nm.

2. A magnetic recording medium wherein the primer layer, the magnetic layer, and the intermediate film have been deposited by sputtering under the application of a negative bias of 100 to 300 V.

3. A magnetic recording medium wherein the primer film formed of a CrMo alloy has a thickness of not more than 30 nm.

4. A magnetic recording medium wherein the nonmagnetic substrate of the medium is a NiP-plated aluminum disk and the magnetic layer has been deposited by sputtering at a substrate temperature of 200 to 320° C.

In the magnetic recording medium of the present invention, the nonmagnetic substrate, the nonmagnetic primer layer, the magnetic recording film (magnetic layers) and the like may be constructed as generally described above and may be formed by the above method and conditions, unless otherwise specified. Further, similarly, the formation of a protective film of carbon or other material and/or an additional primer layer, formed of a metallic material composed mainly of titanium, between the substrate and the overlying primer layer may be formed according to need.

The use of the magnetic recording medium according to the present invention simultaneously offers high S/N ratio and high coercive force. The reason for this is as follows. Since the Mo content of the CrMo primer layer is increased to vary the lattice spacing and to make the lattice spacing close to the lattice spacing of the magnetic film, the crystallographic orientation of the magnetic film can be improved. Further, the division of the magnetic film by a CrMo intermediate film refines the grains, resulting in lower noise level.

Figure 4:
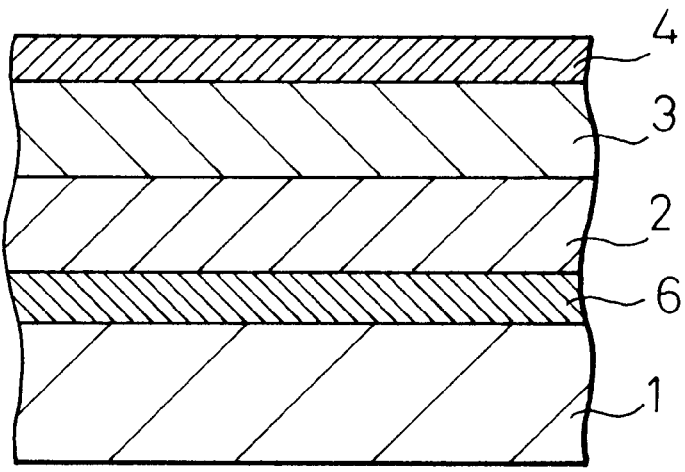
FIG. 4 is a cross-sectional view showing a further preferred embodiment of the magnetic recording medium according to the present invention.
Figure 5:
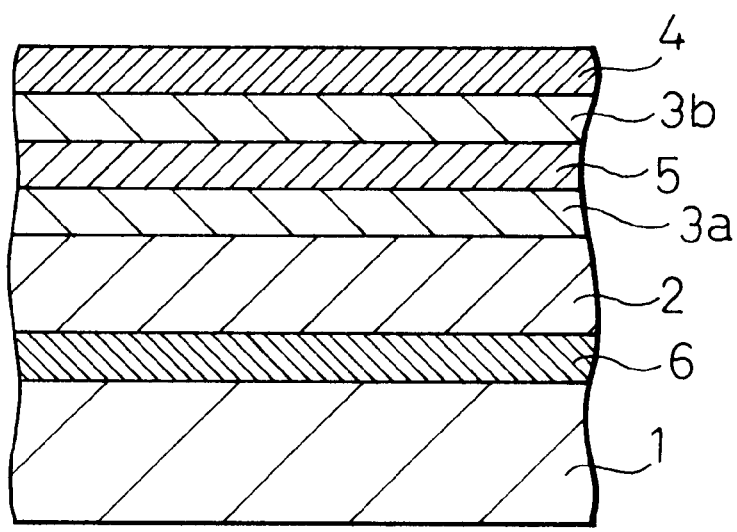
FIG. 5 is a cross-sectional view showing a still further preferred embodiment of the magnetic recording medium according to the present invention.

According to a further embodiment of the magnetic recording medium according to the present invention, an additional primer layer (a thin Ti layer) is interposed between the nonmagnetic substrate and the primer layer, formed of a nonmagnetic metallic material, provided on the substrate, the additional primer layer having such a thickness as will not change the (100) plane orientation of the primer layer. Specifically, as shown in FIGS. 4 and 5 (corresponding respectively to FIGS. 2 and 3), the magnetic recording medium having such an additional primer layer has an additional primer layer (a thin Ti layer) 6 between a nonmagnetic substrate 1 and a primer layer 2, formed of a nonmagnetic metallic material, provided on the substrate 1. Thus, when a thin Ti layer having such a thickness as will not change the (100) plane orientation of the primer layer is provided between the substrate and the overlying primer layer to render the surface state of the substrate uniform, dispersion of grain diameter in the primer layer can be minimized. This embodiment of the present invention, therefore, will have a significant effect in a magnetic recording medium having a primer layer of a CrMo alloy of which the grain diameter varies widely. As described above, Japanese Unexamined Patent Publication (Kokai) No. 7-65348 teaches the interposition of a nucleation control layer, constituted by an amorphous thin film of at least one member selected from Si, Ge, C, and B, between the substrate and the thin film for control of the structure (primer layer of CrMo alloy or the like). However, without a further detailed description, it would be evident that the technique described in this publication does not teach the use of the thin Ti layer and, in addition, the nucleation control layer and the thin Ti layer of the present invention can be clearly distinguished from each other in function. In this connection, it should be noted that the thin Ti layer can ensure better adhesion than semiconductor thin films, e.g., a thin Si film and a thin Ge film.

The following preferred embodiments are embraced in the magnetic recording medium, of the present invention, having a thin Ti layer as an additional primer layer between the nonmagnetic support and the nonmagnetic primer layer.

1. A magnetic recording medium wherein the nonmagnetic primer layer is formed of an alloy of 10 to 30 at % of molybdenum with the balance consisting of chromium.

2. A magnetic recording medium wherein the thin Ti layer has a thickness of 1 to 7 nm.

3. A magnetic recording medium wherein the magnetic recording film provided on the nonmagnetic primer layer is formed of a metallic material comprising cobalt and chromium as main components and platinum as an additive.

4. A magnetic recording medium wherein the magnetic recording film comprises at least one of tantalum and niobium as a further additive in addition to cobalt, chromium, and platinum.

5. A magnetic recording medium wherein the magnetic recording film provided on the nonmagnetic primer layer functions to reproduce a record using a magnetoresistive head or spin-valve head and has a tBr of not more than 120 G.$\mu$m.

In the magnetic recording medium of the present invention as well, the nonmagnetic substrate, the nonmagnetic primer layer, the magnetic recording film and the like may be constructed as generally described above and may be formed by the above method and conditions, unless otherwise specified. Further, as described above, the magnetic recording film may be, if necessary, divided by a nonmagnetic intermediate film into two or more layers to provide a magnetic recording film having a multi-layer structure.

According to a further aspect of the present invention, there is provided a magnetic disk device, particularly magnetoresistive (MR) head, using the magnetic recording medium of the present invention described above and described below in detail. The structure of the magnetic disk device of the present invention is not particularly limited. Basically, however, the device comprises: a recording head section for recording information in a magnetic recording medium; and a reproducing head section for reproducing information. In particular, as will be described below, the reproducing head section is preferably provided with a MR head using a magnetoresistor wherein the electric resistance changes in response to the magnetic field intensity.

Preferably, the magnetic disk device of the present invention has a magnetoresistor and a conductor layer for supplying a sense current into the magnetoresistor, and a composite magnetic head comprising a lamination of a magnetoresistive reproducing head, for reading information from the magnetic recording medium, and an induction type recording head, for recording information on the magnetic recording medium, having a pair of thin film electrodes, may be used. Magnetoresistive reproducing heads usable herein may have various structures known in the art and include AMR (anisotropic magnetoresistive) heads utilizing anisotropic magnetoresistance and GMR (giant magnetoresistive)

heads utilizing giant magnetoresistance (including spin valve GMR head and the like). The conductor layer of the reproducing head may have various constructions. However, preferred conductor layers include:

1. a conductor layer having such a thickness that the thickness of the conductor layer in its portion in the vicinity of the magnetoresistor is relatively small with the thickness in the other portion being thick; and 2. a conductor layer wherein the thickness and the width of the conductor layer in its portion in the vicinity of the magnetoresistor are relatively small with the thickness and the width in the other portions being large. The thickness and optionally the width of the conductor layer to satisfy the above construction requirements may be regulated by various methods. A particularly recommendable method for such regulation is to increase the thickness by forming the conductor layer so as to have a multi-layer structure.

Figure 1:
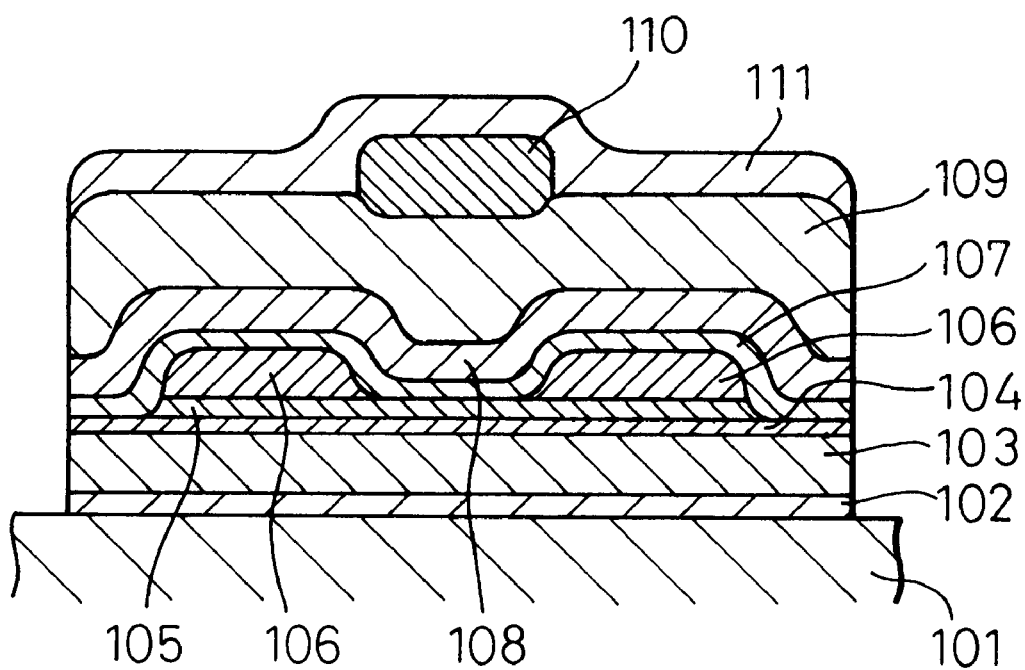
FIG. 1 is a cross-sectional view showing a laminate structure in the vicinity of a recording gap of a composite magnetic recording head used in the conventional magnetoresistive head.

As compared with the conventional composite magnetic head described above with reference to FIG. 1, a magnetic disk device particularly having the above construction can reduce the curving of the magnetic pole of the recording head section and, at the same time, can reduce the resistance of the conductor layer and, when the off-track is small, can read information with high accuracy and sensitivity.

Figure 28:
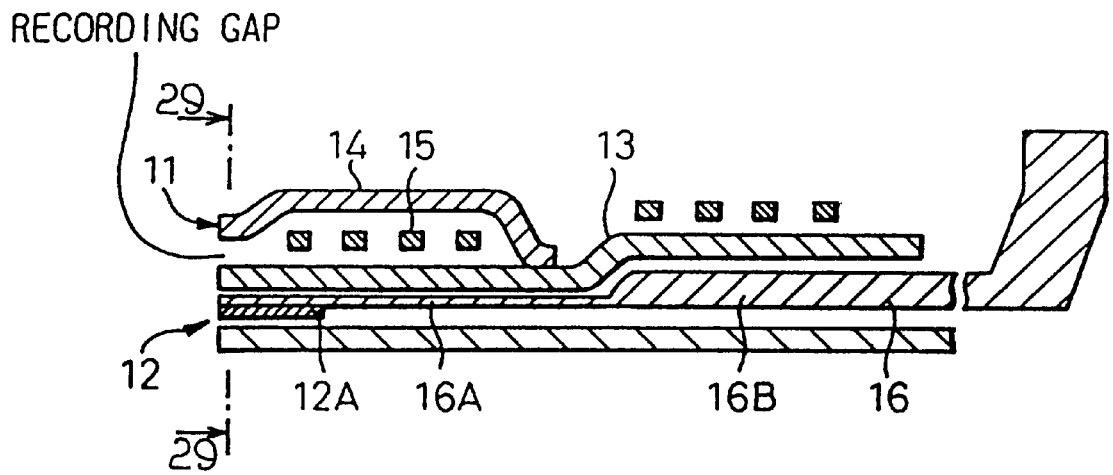
FIG. 28 is a cross-sectional view showing the principle of the magnetoresistive head in the magnetic disk device of the present invention.
Figure 29:
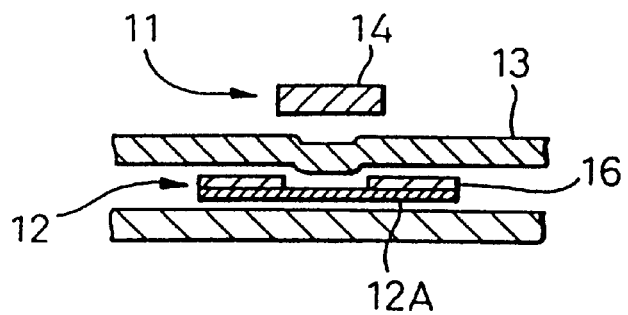
FIG. 29 is a cross-sectional view taken on line B—B of the magnetoresistive head shown in FIG. 28.

In the magnetic disk device of the present invention, preferably, the recording head section and the reproducing head section each may have a laminate structure as shown in FIGS. 28 and 29. FIG. 28 shows a diagram showing the principle of the magnetic disk device of the present invention, and FIG. 29 is a cross-sectional view taken on line B—B of FIG. 28.

In FIGS. 28 and 29, numeral 11 designates an induction type recording head section for recording information on a magnetic recording medium, and numeral 12 a magnetoresistive reproducing head section for reading information. The recording head section 11 comprises: a lower magnetic pole (an upper shield layer) 13 of NiFe or the like; an upper magnetic pole 14, of NiFe or the like, which faces the lower magnetic pole 13 while leaving a certain space; and a coil 15 for exciting the magnetic poles 13, 14 and permitting information recording on the magnetic recording medium to be conducted in a recording gap section.

The reproducing head section 12 is preferably constituted by an AMR head, a GMR head or the like. On a magnetoresistor section 12A are provided a pair of conductor layers 16, for supplying a sense current into the magnetoresistor 12A, while leaving a space, corresponding to the width of a recording track, between the two conductor layers. In this case, the thickness of the conductor layers 16 is such that thickness of a portion 16A in the vicinity of the magnetoresistor section 12A is small with the thickness of the other portion 16B being large.

In the constructions shown in FIGS. 28 and 29, since the thickness of the conductor layer 16 is small in the portion 16A in the vicinity of the magnetoresistor section 12A, the curving of the lower magnetic pole (upper shield layer) 13 and the like is small. By virtue of this, the recording gap facing the magnetic recording medium is also not significantly deformed. Therefore, even though the position, on a track, of the magnetic head at the time of information recording is somewhat different from the position, on the track, of the magnetic recording at the time of reading of the information, the magnetic disk device can accurately read information, making it possible to avoid a problem that reading errors occur despite a small off-track.

On the other hand, since the thickness of the conductor layer 16 is large in the portion 16B other than that in the vicinity of the magnetoresistor section 12A, the resistance of the whole conductor layer 16 can be reduced. As a result, a change in resistance of the magnetoresistor section 12A can be detected with a high sensitivity, resulting in improved S/N ratio. Further, generation of heat in the conductor layer 16 can also be avoided, preventing the creation of noise attributable to the generation of heat.

EXAMPLES

The present invention will be described in more detail with reference to typical examples thereof. However, it should be understood that the present invention is not limited to these examples only.

Example 1

Figure 6:
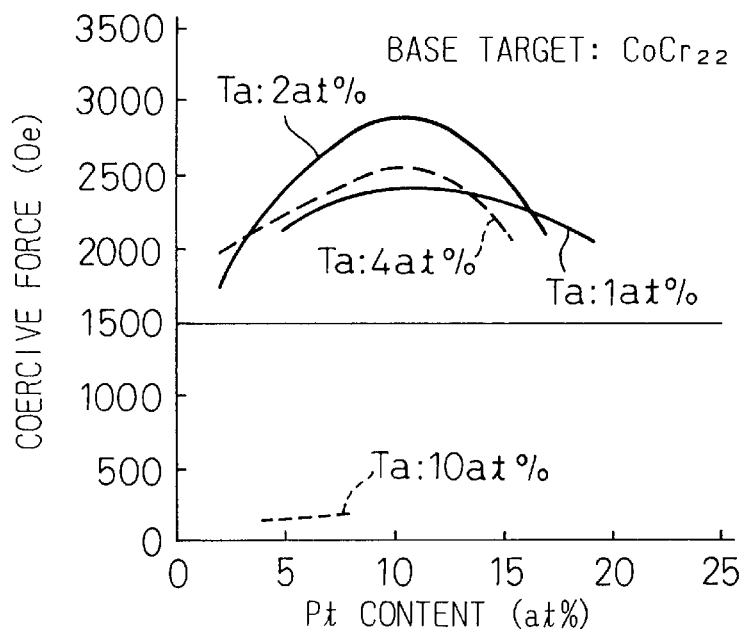
FIG. 6 is a graph showing the dependency of the coercive force of a magnetic recording medium (CoCrTaPt/Cr) upon the Pt content.
Figure 7:
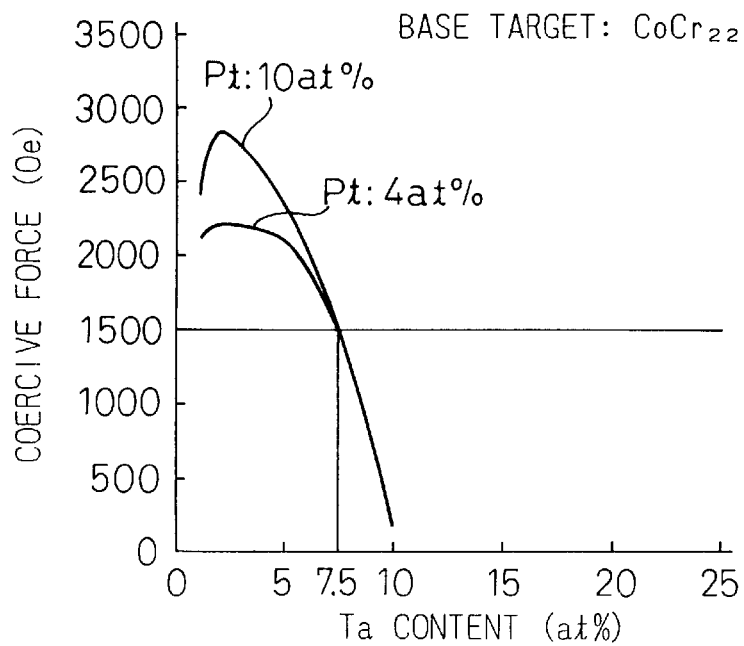
FIG. 7 is a graph showing the dependency of the coercive force of a magnetic recording medium (CoCrTaPt/Cr) upon the Ta content.
Figure 8:
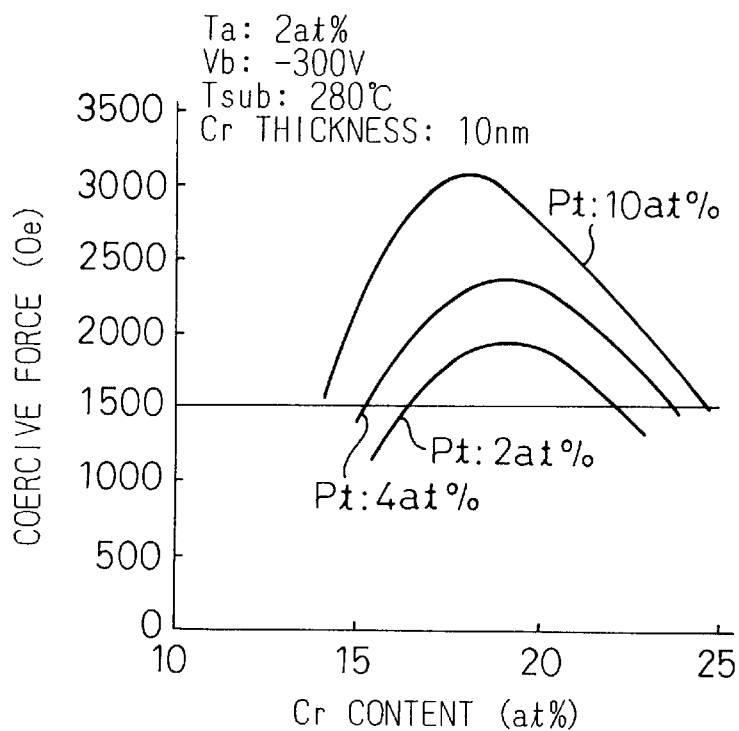
FIG. 8 is a graph showing the dependency of the coercive force of a magnetic recording medium (CoCrTaPt/Cr) upon the Cr content.

A primer film of Cr, a recording film of CoCrTaPt, and a protective film of C were laminated in that order on a NiP/Al disk substrate having a thoroughly cleaned and satisfactorily smooth surface, using a DC magnetron sputtering system. In this case, a sputtering chamber was evacuated to not more than $3 \times 10^{-7}$ Torr prior to the formation of the primer film, the substrate was heated at 280° C., an Ar gas was introduced into the sputtering chamber at 5 mTorr, and Cr was sputtered, while applying a bias of −400 V, thereby forming a 10 nm-thick Cr film as the primer film. A CoCrTaPt film having a Brt of 100 Gum was formed thereon. The composition of the CoCrTaPt recording film was varied by using a composite target, wherein Ta and Pt chips were placed on a CoCr target, and the relationship between the composition of the recording film and the magnetic properties was investigated. The Energy dispersion spectroscopy (EDS) was used for the analysis of the composition, while VSM was used for magnetic measurements. $Co_{84}Cr_{16}$, $Co_{82}Cr_{18}$, $Co_{78}Cr_{22}$, $Co_{76}Cr_{24}$ (at %) were used as the CoCr target. The results are shown in FIGS. 6 to 8. As is apparent from these drawings, the coercive force has a peak around Ta content 2 to 5 at %, and the addition of Ta exceeding this value results in rapidly lowered coercive force. For Pt, the coercive force does not significantly vary as compared with Ta. However, it has a peak around 10 at %. For Cr, the coercive force has a peak at a little less than 20 at % and, when the Cr content exceeds this value, it falls. However, even in the case of 21 at % Cr with 4 at % Pt and 2 at % Ta, the coercive force is not less than 2000 Oe.

Figure 9:
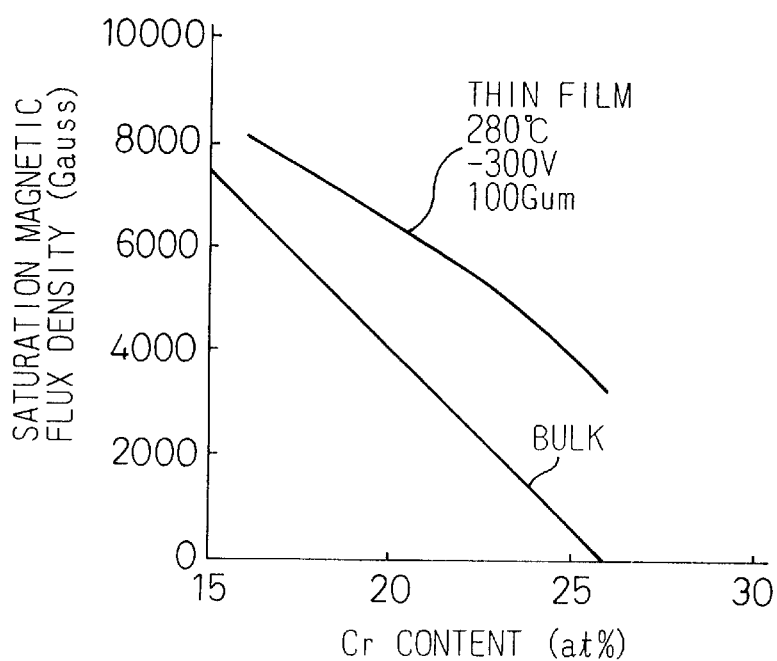
FIG. 9 is a graph showing the dependency of the saturation magnetic flux density of bulk and thin film of CoCr upon the Cr content.

Further, from FIG. 9, it is apparent that, due to the dependency of saturation magnetization of the CoCr film upon Cr content, even in the case of the same composition, the thin film offers larger saturation magnetization than the bulk. This is because the progress of segregation into grain boundaries resulted in lowered concentration of Cr bonded to Co. This tendency becomes significant with increasing the applied bias, demonstrating that the application of bias is effective for lowering the noise level.

Example 2

A primer film of Cr, a recording film of CoCrTaPt, and a protective film of C were laminated in that order on a NiP/Al disk substrate having a thoroughly cleaned and satisfactorily smooth surface, using a DC magnetron sputtering system. In this case, a sputtering chamber was evacuated to not more than $3 \times 10^{-7}$ Torr prior to the formation of the primer film, the substrate was heated at 200 to 320° C., and an Ar gas was introduced into the sputtering chamber at 5 mTorr. Cr was sputtered to form a 10 to 40 nm-thick primer film. Thereafter, a recording film (Co77Cr15Pt4Ta4) having a Brt of 120 Gum was formed thereon. A DC bias voltage of 0 to −400 V was applied during the formation of the recording film. Further, a 15 nm-thick protective film of C was formed on the recording film.

Figure 10:
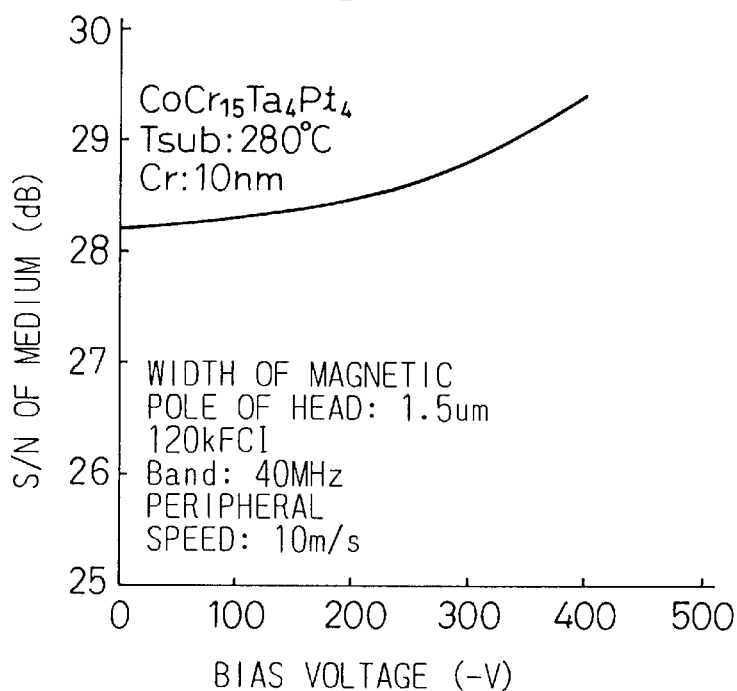
FIG. 10 is a graph showing the dependency of S/N of medium upon the bias voltage.

For the medium thus obtained, the dependency of the noise level of the medium upon the bias voltage is shown in FIG. 10. As is apparent from FIG. 10, the S/N ratio increases with increasing the bias voltage. This is because, when the bias is high, the amount of Cr segregated in magnetic grain boundaries is so large that good isolation of the magnetic particles from the other magnetic particles is attained, resulting in lowered noise level of the medium.

Figure 11:
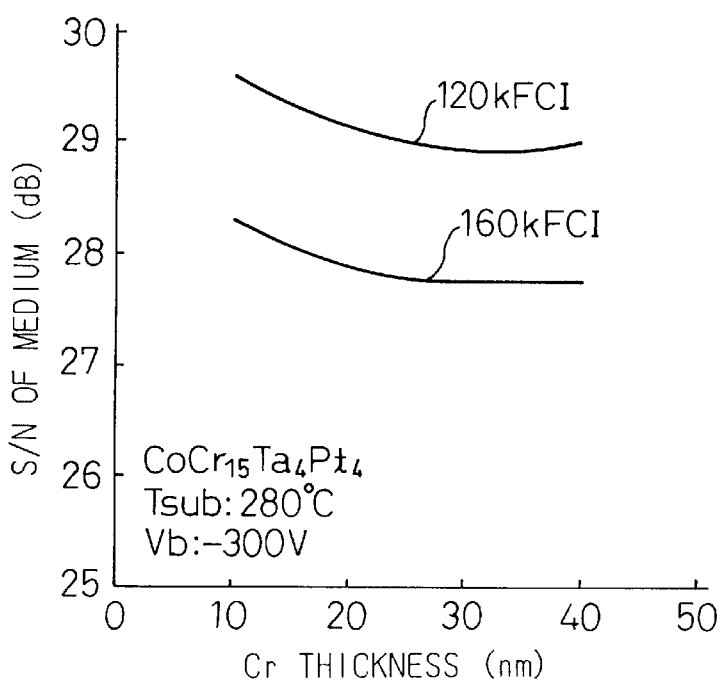
FIG. 11 is a graph showing the dependency of S/N of medium (CoCrTaPt) upon the thickness of Cr primer film.

The dependency of the S/N ratio of the medium upon the thickness of the Cr primer layer is shown in FIG. 11. It has been found that, in the film forming system used in the present invention, the thickness of the Cr primer layer is suitably not more than 30 nm. Further, for the MR head used in the present invention, the optimal Brt value was 120 Gum.

A magnetic disk device having an areal recording density of 400 Mb/in$^2$ and a memory capacity of not less than 1.5 GB in terms of the device capacity was prepared using a MR head and four 95 mmø magnetic disks as described above. Since the spacing can be enhanced as compared with devices using the conventional recording medium, the reliability regarding sliding resistance can be improved. Further, when the spacing is the same as that in the prior art, even an increase in face recording density to 1.6 Gb/in$^2$, that is, a four-fold increase in face recording density, can offer a satisfactorily high S/N ratio, realizing a device having a reduced size and an increased capacity.

Example 3

A nonmagnetic primer film, a magnetic film of CoCr15Pt4Ta4 (at %), a nonmagnetic intermediate film, a magnetic film of CoCr15Pt4Ta4 (at %), and a protective film of C were laminated in that order on a NiP/Al disk substrate having a thoroughly cleaned and textured surface, using a DC magnetron sputtering system. In this case, a sputtering chamber was evacuated to not more than 3×10$^{-7}$ Torr prior to the formation of the primer film, the substrate was heated at 280° C., an Ar gas was introduced into the sputtering chamber at 5 mTorr, and CrMo20 (at %) was sputtered while applying a bias of 200 V, thereby forming a 10 to 50 nm-thick nonmagnetic primer film. A CoCrPtTa film having a Brt of 100 Gum (thickness 20–25 nm varied depending upon the primer film material) was formed thereon. CrMo20 was selected as the intermediate film for dividing the CoCrPtTa film into two layers.

Figure 12:
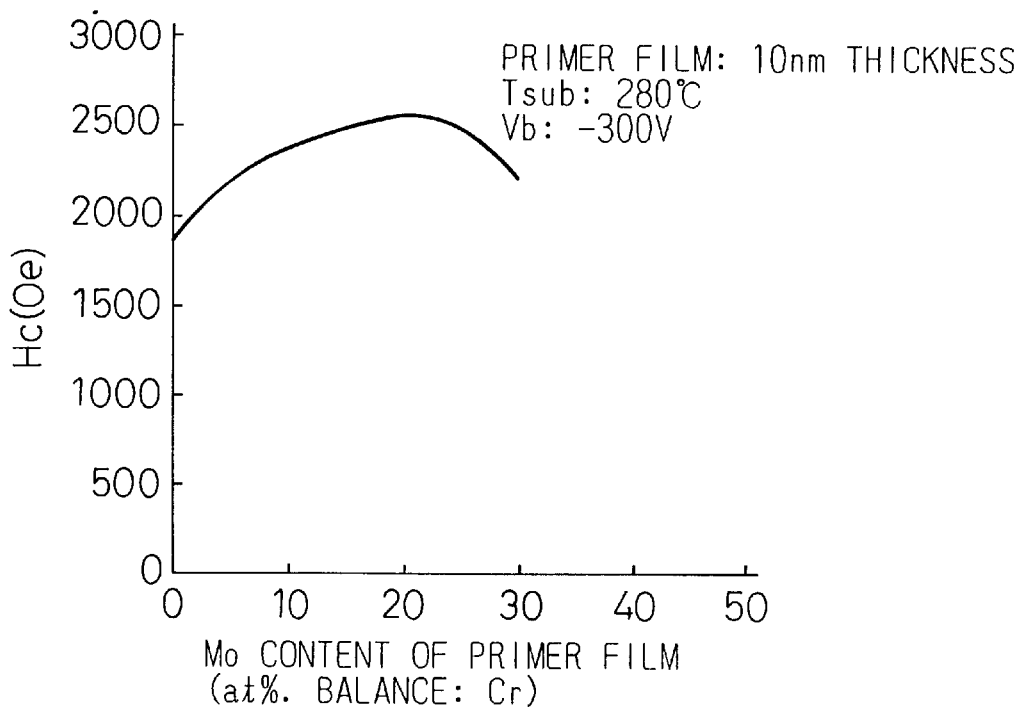
FIG. 12 is a graph showing the dependency of the coercive force of a magnetic recording medium (CoCrPtTa/CrMo) upon the composition of a CrMo primer film.

The dependency of the coercive force of a magnetic film having a single layer structure of CoCrPtTa upon the CrMo composition is shown in FIG. 12. As is apparent from FIG. 12, the coercive force increases with increasing the amount of the Mo added, reaches the maximum around Mo content 20 at % and decreases with further increasing the amount of Mo added. However, even in the case of the Mo content 30 at %, the coercive force is higher than that in the case of a Cr primer film.

Figure 13:
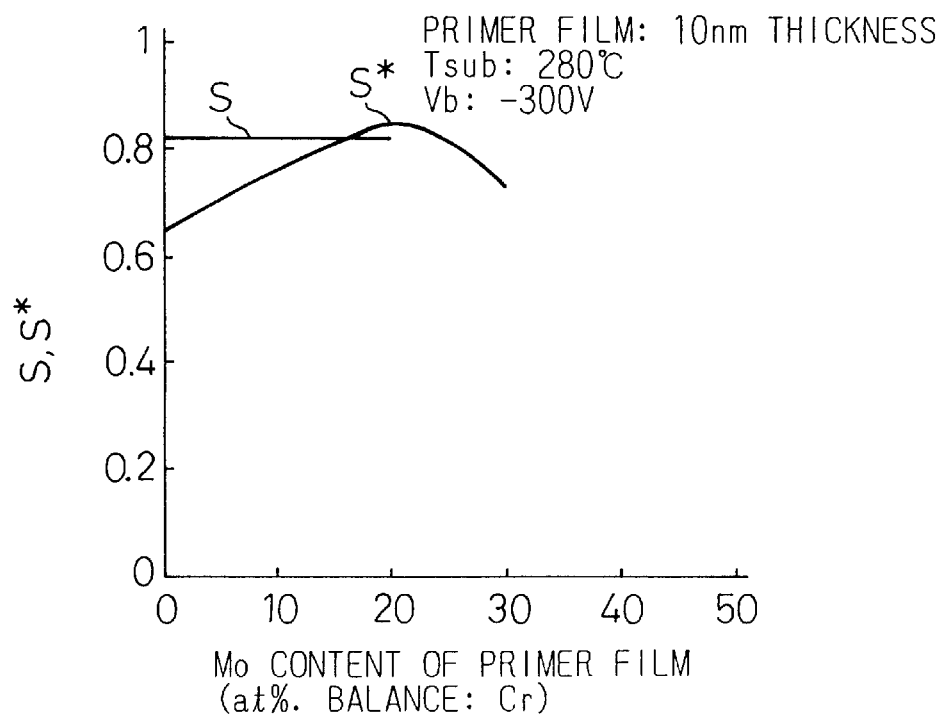
FIG. 13 is a graph showing the dependency of the squareness ratio of a magnetic recording medium (CoCrPtTa/CrMo) upon the composition of a CrMo primer film.

The dependency of the squareness ratio upon the CrMo content of the primer film is shown in FIG. 13. S* reaches the maximum around CrMo20 (at %).

Figure 14:
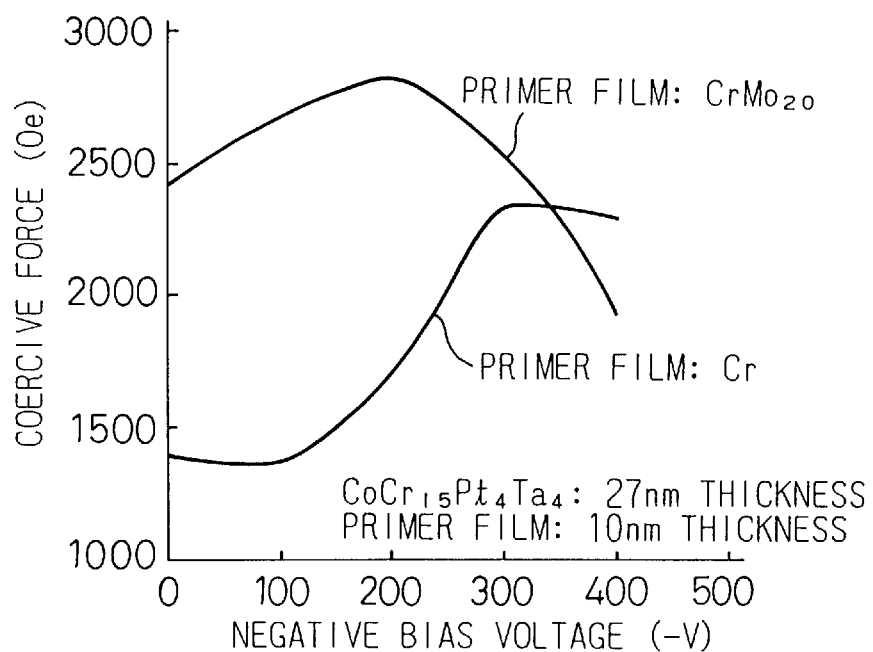
FIG. 14 is a graph showing the dependency of the magnetic property of a magnetic recording medium (CoCrPtTa/Cr.CrMo) upon the bias voltage.

The dependency of the coercive force of a magnetic film having a single layer structure of CoCrPtTa upon the primer film and the bias voltage applied to the magnetic film is shown in FIG. 14. As is apparent from FIG. 14, for CrMo20, the application of a bias voltage of not more than 300 V offers a higher coercive force than that in the absence of any bias.

Figure 15:
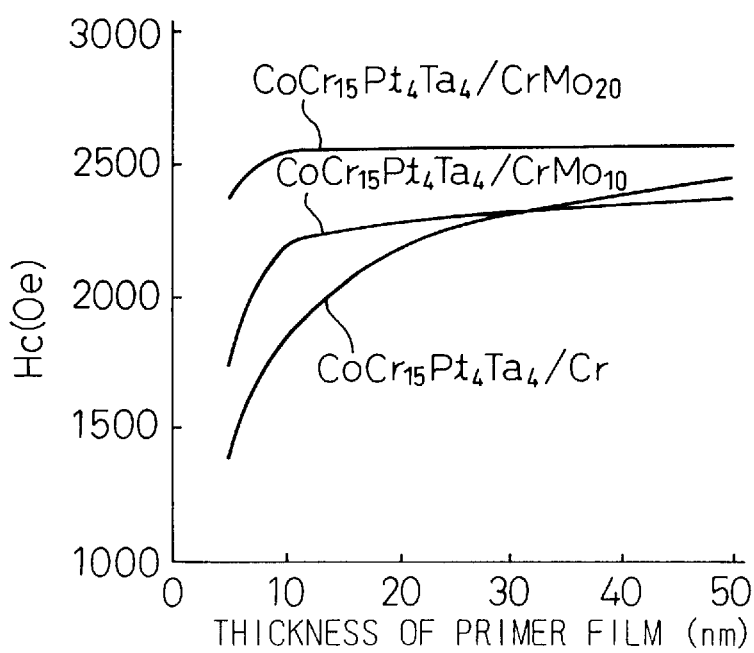
FIG. 15 is a graph showing the dependency of the coercive force of a magnetic recording medium upon the thickness of a primer film.

The dependency of the coercive force of a magnetic film having a single layer structure of CoCrPtTa upon the primer film is shown in FIG. 15. As is apparent from FIG. 15, for a higher Mo content (in the range of from 0 to 20 at %) of CrMo, the coercive force is saturated in a smaller thickness of the primer film.

Figure 16:
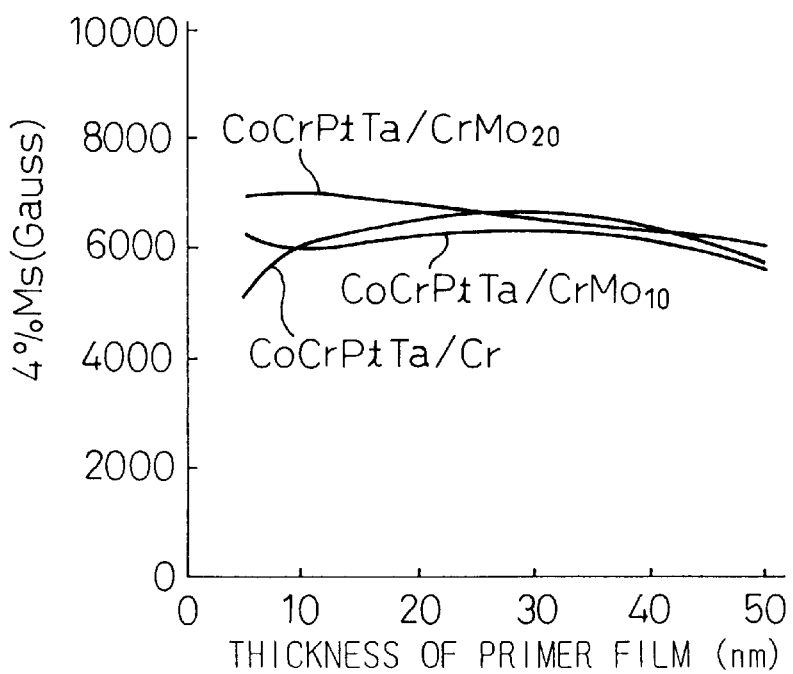
FIG. 16 is a graph showing the dependency of the saturation magnetic flux density of a magnetic recording medium upon the thickness of a primer film.

The dependency of the saturation magnetization of a magnetic film having a single layer structure of CoCrPtTa upon the thickness of the primer film is shown in FIG. 16. As is apparent from FIG. 16, the saturation magnetization is likely to fall when the thickness of the primer film increases.

Figure 17:
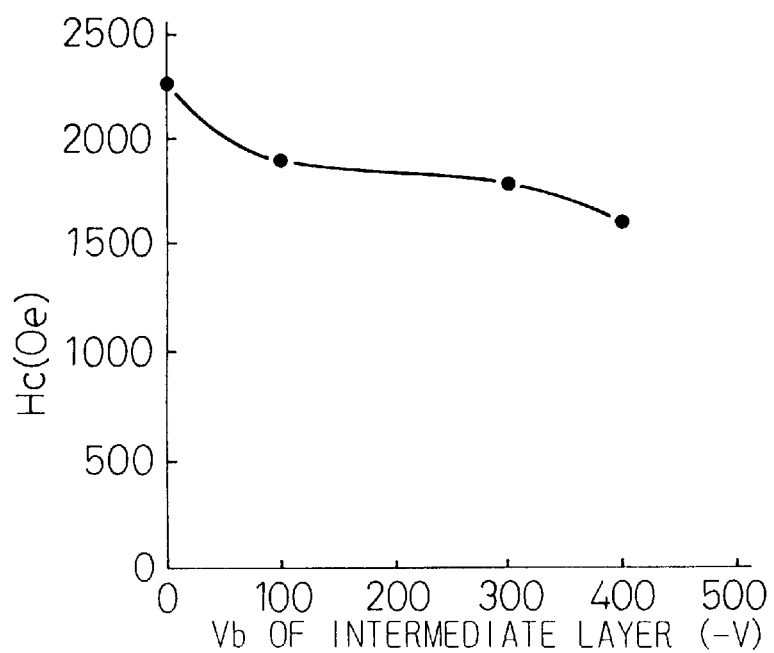
FIG. 17 is a graph showing the dependency of the coercive force upon the bias voltage applied to an intermediate layer in a CCPT/CrMo multi-layer film/CrMo.

A change in coercive force upon a change in bias voltage of the nonmagnetic intermediate film with the bias of the nonmagnetic primer film and the magnetic film being fixed to 200 V is shown in FIG. 17. As is apparent from FIG. 17, the coercive force falls when the bias voltage applied to the nonmagnetic intermediate film increases. This is because the application of the bias to the nonmagnetic intermediate film causes the intermediate film material to be diffused into the lower magnetic film, resulting in deteriorated magnetic properties of the lower magnetic film.

Example 4

A nonmagnetic primer film, a magnetic film of CoCr15Pt4Ta4 (at %), and a protective film of C were laminated in that order on a NiP/Al disk substrate having a thoroughly cleaned and textured surface. In this case, a sputtering chamber was evacuated to not more than 3×10$^{-7}$ Torr prior to the formation of the primer film, the substrate was heated at 280° C., an Ar gas was introduced into the sputtering chamber at 5 mTorr, and Cr, CrMo10 (at %), and CrMo20 (at %) were sputtered while applying a bias of 0 to −400 V, thereby forming 10 to 50 nm-thick primer films. A CoCrTaPt film having a Brt of 100 Gum (thickness 25 nm) was formed thereon.

Figure 18:
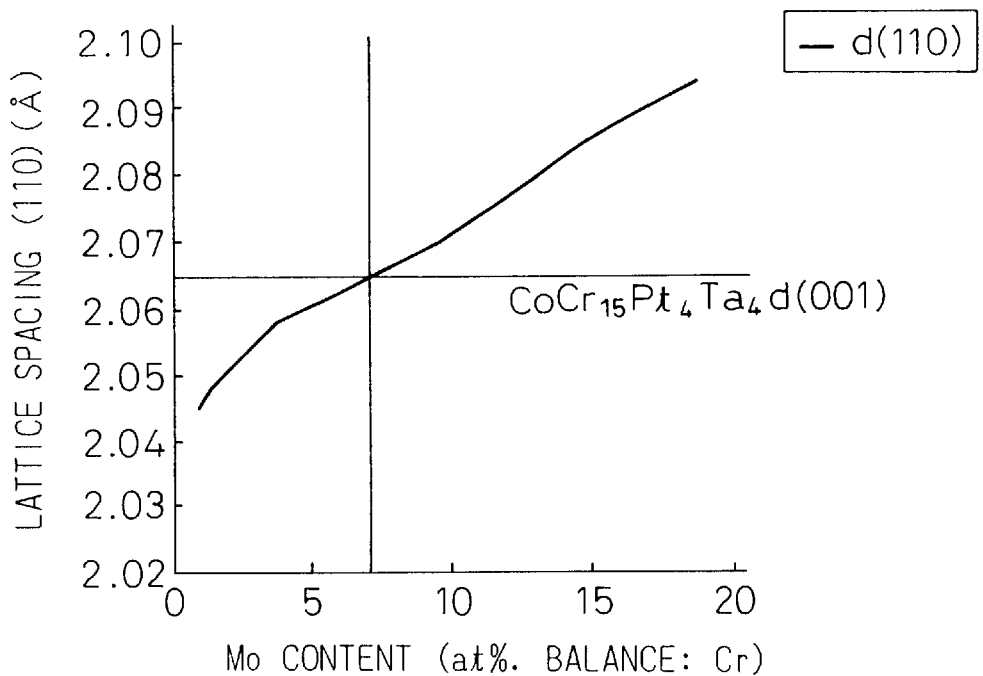
FIG. 18 is a graph showing the dependency of CrMo primer film (110) lattice spacing upon the Mo content.

FIG. 18 shows a change in lattice face spacing, as measured by X-ray diffractometry, of a CrMo film as a function of the Mo content. The lattice spacing of a magnetic film of CoCr15Pt4Ta4 (at %) is also shown in FIG. 18. As is apparent from FIG. 18, the lattice spacing of the (110) plane of the primer film of CrMo and that of the (001) plane of the magnetic film of CoCr15Pt4Ta4 becomes equal to each other around an Mo content of 7 at %. Further, when the Mo content is further increased, the lattice spacing of the primer film becomes larger than the lattice spacing of the magnetic film, and in the case of Mo content 20 at %, the lattice spacing of the magnetic film is about 1% larger than that of the primer film.

A change in magnetic property of the magnetic film as a function of the CrMo composition of the primer film is shown in FIGS. 12 and 13 (noted above). From FIGS. 12 and 13, the coercive force has a peak around Mo content 20 at %. The squareness ratio also is improved by the addition of Mo and has a peak around Mo content 20 at %.

The dependency of the magnetic property upon the bias voltage is shown in FIG. 14 (noted above). In the case of a primer film of Cr, the application of a bias voltage of −100 to −300 results in improved coercive force and squareness ratio. On the other hand, in the case of a primer film of CrMo20, the coercive force is higher than that of the primer film of Cr, as a whole, and reaches the maximum at a negative bias of −200 V.

Figure 19:
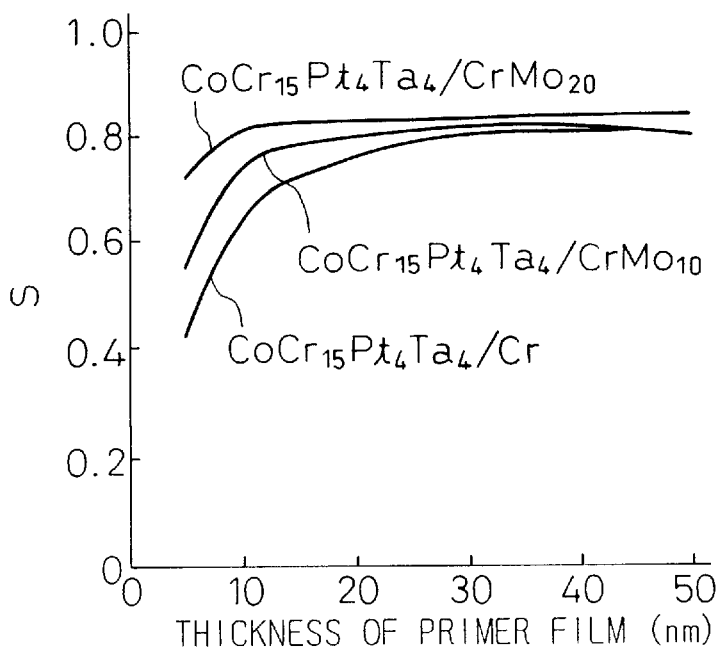
FIG. 19 is a graph showing the dependency of the coercive force squareness ratio of a magnetic recording medium upon the thickness of a primer film.
Figure 20:
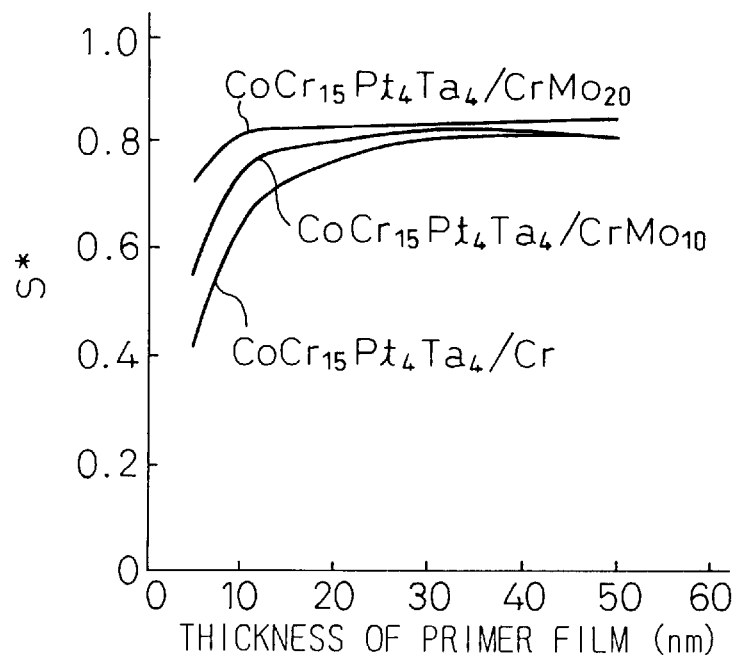
FIG. 20 is a graph showing the dependency of the squareness ratio of a magnetic recording medium upon the thickness of a primer film.

The dependency of the magnetic property upon the thickness of the nonmagnetic primer film is shown in FIGS. 15 and 16 (noted above) and FIGS. 19 and 20. As is apparent from these drawings, a higher Mo content of the primer film offers high coercive force and squareness ratio in a smaller thickness of the primer film, and, in the case of CrMo20, the magnetic property is saturated in a primer film thickness of 10 nm.

Figure 21:
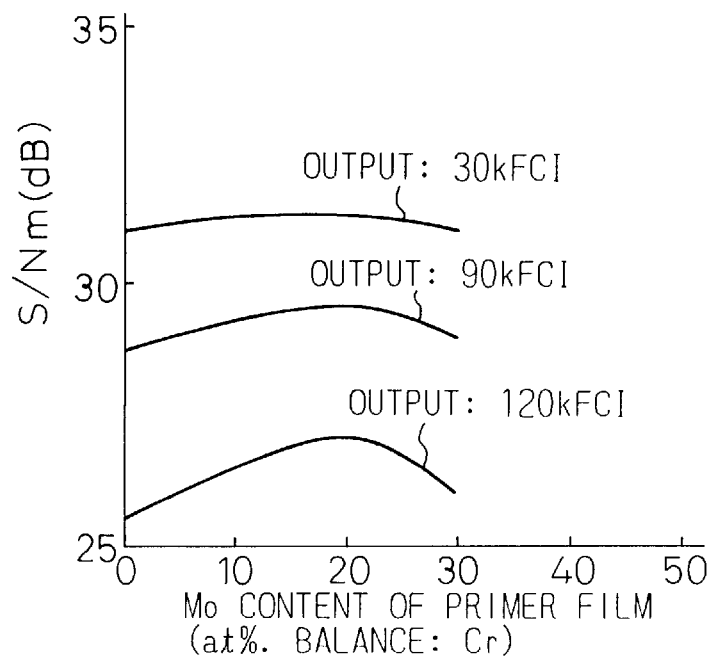
FIG. 21 is a graph showing the dependency of S/N of a CCPT15-4-4 single-layer film upon the composition of a CrMo primer film.

FIG. 21 shows a change in S/N ratio of a medium as a function of the CrMo content of the primer film. As is apparent from FIG. 21, the S/N ratio reaches the maximum in the case of CrMo20 (at %). The same effect can be attained when Ta added as a fourth element to the magnetic film has been replaced with B or Nb.

Example 5

A nonmagnetic primer film, a magnetic film of CoCr15Pt4Ta4 (at %), a nonmagnetic intermediate film, a recording film of CoCrTaPt, and a protective film of C were laminated in that order on a NiP/Al disk substrate having a thoroughly cleaned and textured surface, using a DC magnetron sputtering system. In this case, a sputtering chamber was evacuated to not more than $3 \times 10^{-7}$ Torr prior to the formation of the primer film, the substrate was heated at 280° C., an Ar gas was introduced into the sputtering chamber at 5 mTorr, and Cr, CrMo10, and CrMo20 (at %) were sputtered under the application of a bias of −300 V, thereby forming 10 nm-thick primer films. A CoCrTaPt film having a Brt of 100 Gum (thickness 25 nm) was formed thereon. In this case, however, the recording film had a two-layer structure, and an intermediate film of CrMo with the thickness being varied in the range of from 1 to 5 nm was interposed between the layers. The composition of the intermediate film of CrMo was the same as that of the primer film.

Figure 22:
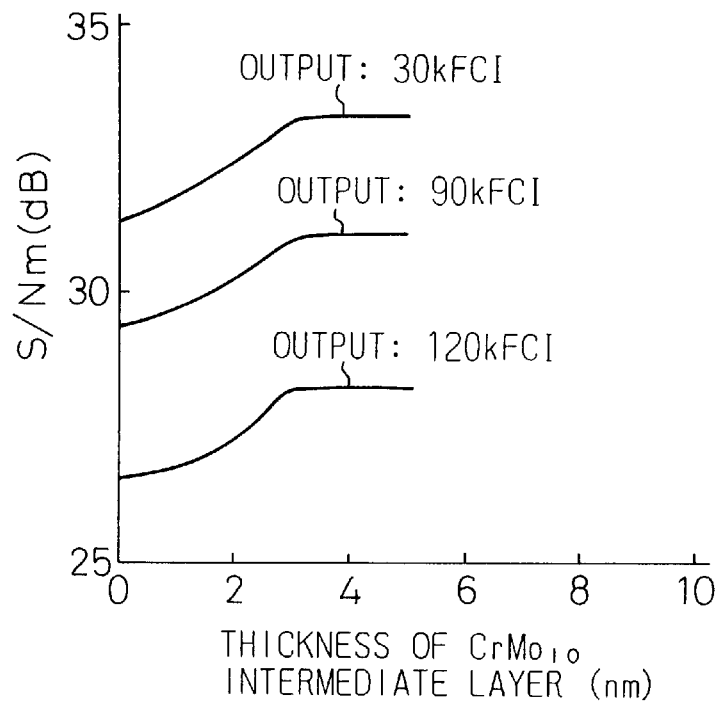
FIG. 22 is a graph showing the dependency of S/N of a CCPT15-4-4 multi-layer film upon the thickness of a CrMo intermediate layer.
Figure 23:
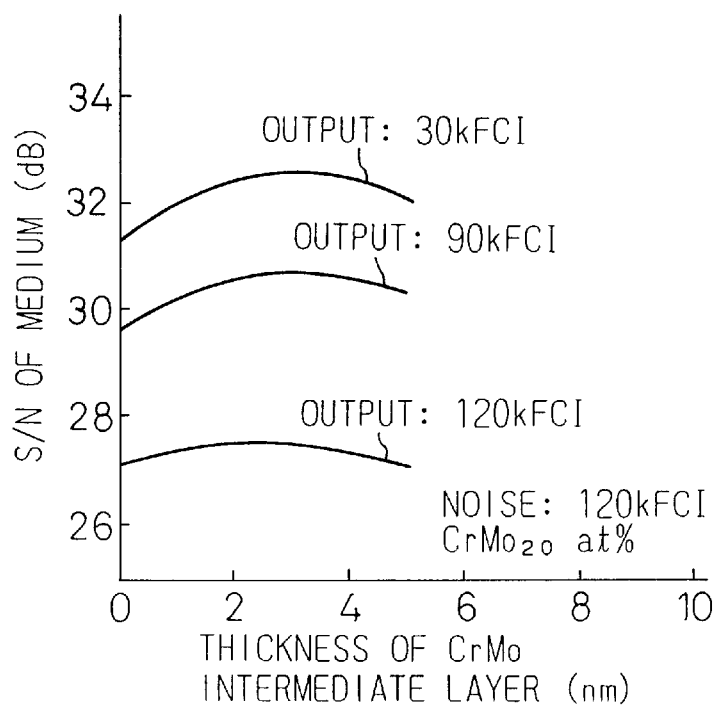
FIG. 23 is a graph showing the dependency of S/N of a multi-layer film upon the thickness of a CrMo intermediate layer.
Figure 24:
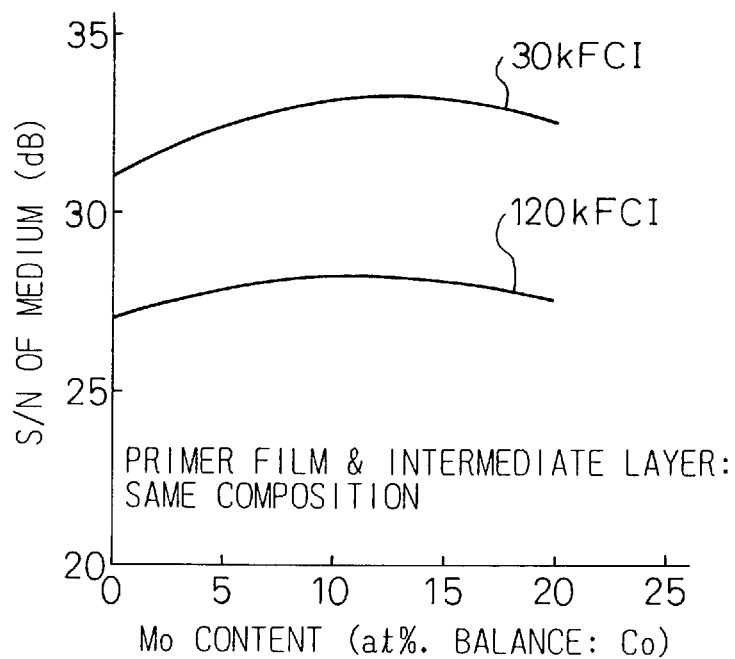
FIG. 24 is a graph showing the dependency of S/N of a CoCrPtTa multi-layer film/Cr(Mo) upon the CrMo composition.

The dependency of the S/N ratio of the medium upon the thickness of the CrMo intermediate films with CrMo10 and CrMo20 are shown in FIGS. 22 and 23, and the dependency of the S/N ratio of the medium upon the CrMo content is shown in FIG. 24. From FIGS. 22 and 23, it is apparent that, for CrMo10, the S/N ratio of the medium is saturated in an intermediate film thickness of 3 nm, while, for CrMo20, the S/N ratio of the medium reaches the maximum in an intermediate film thickness of 3 nm. FIG. 24 shows a graph, for the same data, obtained by plotting the CrMo content as abscissa. From FIG. 24, it is apparent that CrMo content 10 at % offers the maximum S/N ratio. The same effect can be attained when Ta added as a fourth element to the magnetic film has been replaced with B or Nb.

A magnetic disk device having an areal recording density of 400 Mb/in$^2$ and a memory capacity of not less than 1.5 GB in terms of the device capacity was prepared using a MR head and four 95 mmø magnetic disks as described above. Since the spacing can be enhanced as compared with devices using the conventional recording medium, the reliability regarding sliding resistance can be improved. Further, when the spacing is the same as that in the prior art, even an increase in areal recording density to 1.6 Gb/in$^2$, that is, a four-fold increase in areal recording density, can offer a satisfactorily high S/N ratio, realizing a device having a reduced size and an increased capacity.

Example 6

A magnetic recording medium having a construction as shown in FIG. 4 (cross-sectional view) was prepared. In FIG. 4, numeral 1 designates a NiP—Al substrate. Numeral 6 designates a Ti thin film which is provided on the NiP—Al substrate. Numeral 2 designates a 25 nm-thick Cr—Mo primer film which is provided on the Ti thin film. Numeral 3 designates a 27 nm-thick magnetic film comprising Pt-containing Co alloy. Numeral 4 designates a protective film of C.

Figure 25:
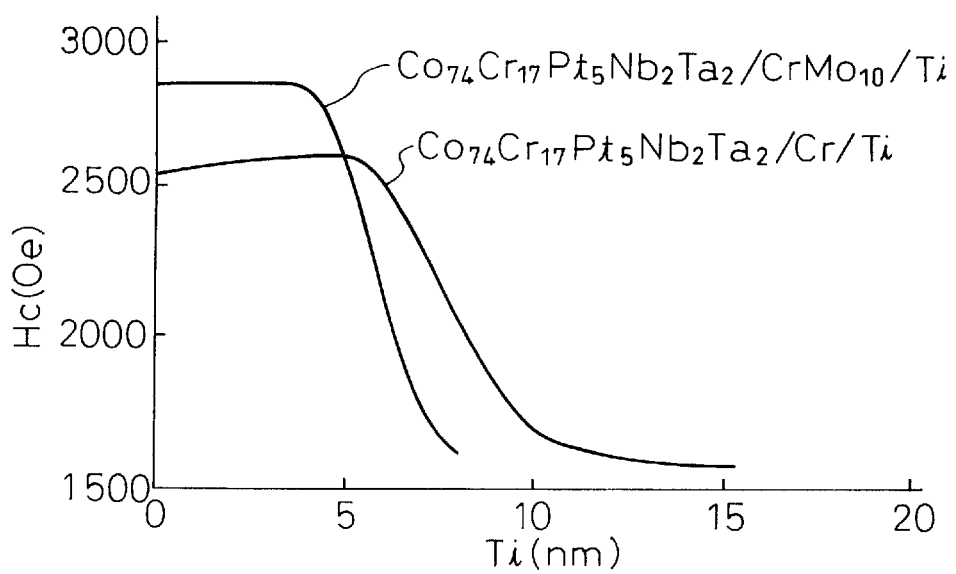
FIG. 25 is a graph showing the dependency of the coercive force of a magnetic recording medium (CoCrPtNbTa/CrMo/Ti) upon the Ti thickness.

The dependency of the in-plane coercive force (Hc) of two Co alloy magnetic recording media different from each other in primer film, i.e., $Co_{74}Cr_{17}Pt_5Nb_2Ta_2$/$CrMo_{10}$/Ti and $Co_{74}Cr_{17}Pt_5Nb_2Ta_2$/Cr/Ti, upon the thickness of the Ti thin film is shown in FIG. 25. These two magnetic recording media were identical to each other in film forming conditions (sputtering power, substrate temperature at the time of initiation of film formation, and Ar gas pressure). As is apparent from FIG. 25, when the thickness of the Ti thin film is in the range of from 0 to 5 nm, the in-plane coercive force of the $Co_{74}Cr_{17}Pt_5Nb_2Ta_2$/$CrMo_{10}$/Ti medium is higher than that of the $Co_{74}Cr_{17}Pt_5Nb_2Ta_2$/Cr/Ti medium. That is, it is apparent that, in the case of the $Co_{74}Cr_{17}Pt_5Nb_2Ta_2$, the $CrMo_{10}$ primer film develops the coercive force more easily than the Cr primer film. This is because, in the case of a Pt-containing Co alloy magnetic recording film, like $Co_{74}Cr_{17}Pt_5Nb_2Ta_2$, the axis of easy magnetization is crystallographically easily oriented within the plane of the medium in the case of the $CrMo_{10}$ primer film having a wider crystal lattice than the Cr primer film. It has been confirmed that the same effect can be attained when the Mo content of the Cr primer film is increased up to about 20 at %. Therefore, the amount of Mo added to the Cr primer film is preferably 10 to 20 at %.

Further, from FIG. 25, it is apparent that, for both the media, the in-plane coercive force rapidly decreases when the thickness of the Ti thin film exceeds 5 nm.

Figure 26:
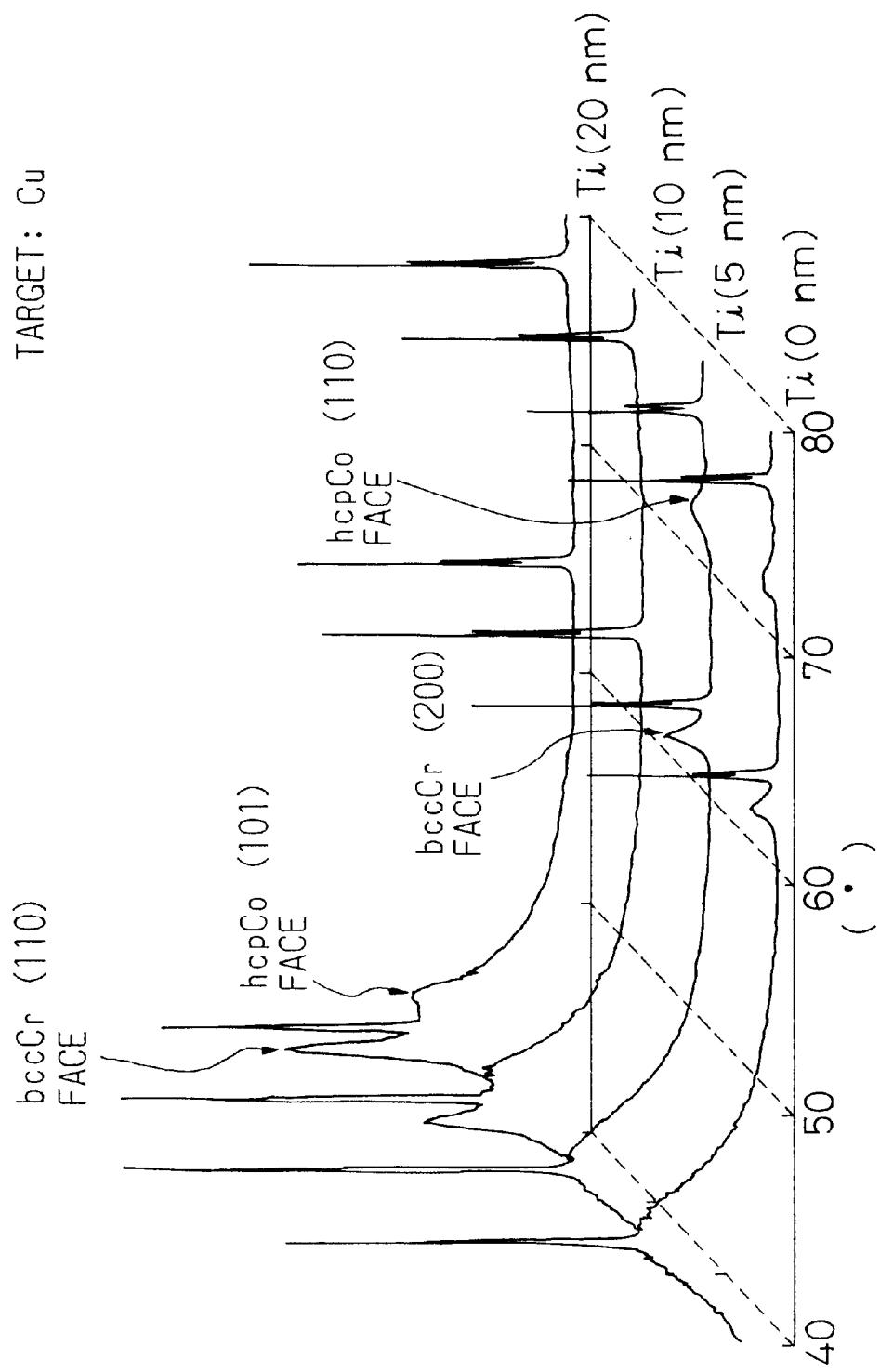
FIG. 26 is a graph showing the dependency of the XRD spectrum of a magnetic recording medium (CoCrPtNbTa/CrMo/Ti) upon the Ti thickness.

FIG. 26 shows the results of investigations on how the XRD spectrum of the $Co_{74}Cr_{17}Pt_5Nb_2Ta_2$/$CrMo_{10}$/Ti medium changes with increasing the thickness of the Ti thin film. In an X-ray spectrum of the medium having a Ti thin film thickness of not more than 5 nm, diffraction lines characteristic of body-centered cubic Cr (200) plane and hexagonal Co (110) plane are clearly observed. Therefore, it is apparent that the axis of easy magnetization (C-axis) of the medium is fully oriented within the plane of the medium. On the other hand, when the thickness of the Ti thin film is not less than 10 nm, diffraction lines characteristic of body-centered cubic Cr (110) plane and hexagonal Co (101) face are clearly observed. Therefore, it is apparent that, as compared with the Ti thin film thickness of not more than 5 nm, the axis of easy magnetization (C-axis) of the medium is oriented so as to rise from the medium plane. That is, it can be said that the reduction in the in-plane coercive force in the case of a Ti thin film thickness exceeding 5 nm is attributable to a change in growth face of the primer film which results in deteriorated in-plane orientation of the axis of easy magnetization (C-axis) of the magnetic film.

Figure 27:
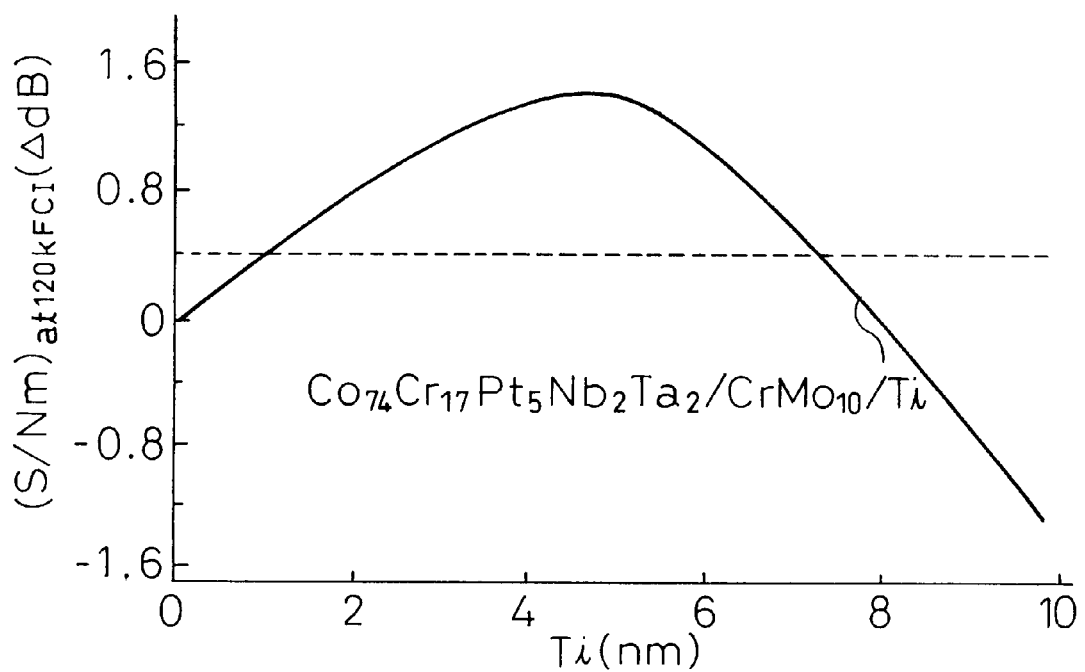
FIG. 27 is a graph showing the dependency of S/Nm of a magnetic recording medium (CoCrPtNbTa/CrMo/Ti) upon the Ti thickness.

FIG. 27 shows the dependency of the S/Nm ratio of the $Co_{74}Cr_{17}Pt_5Nb_2Ta_2$/$CrMo_{10}$ medium on the thickness of the Ti thin film. As is apparent from FIG. 27, a Ti thin film thickness of 5 nm offers the maximum S/Nm ratio. This is because the provision of a Ti thin film, having such a thickness as will not change the magnetic property (in-plane coercive force Hc) of the magnetic layer, between the substrate and the $CrMo_{10}$ primer film resulted in reduced unevenness of the surface of the substrate and in turn resulted in even particle diameters in the layer provided on the substrate. From FIG. 27, it is apparent that the thickness of the Ti thin film is preferably 1 to 7 nm which can clearly improve the S/Nm ratio.

As is apparent from the above results, the use of a $CrMo_{10}$ primer film in combination with the provision of a Ti thin film, having a thickness that will not deteriorate the magnetic property of the magnetic layer (1–7 nm), between the $CrMo_{10}$ primer film and the substrate for a magnetic recording medium can provide a Co alloy medium suitable for high-density recording with high in-plane coercive force and good S/Nm.

Although the above embodiment has been described by taking a $Co_{74}Cr_{17}Pt_5Nb_2Ta_2/CrMo_{10}/Ti$ medium as an example, it has been confirmed that, in the combination of $CrMo_{10}$ primer film with Ti thin film, the same effect can be attained for $Co_{74}Cr_{17}Pt_5Nb_4/CrMo_{10}/Ti$ and $Co_{74}Cr_{17}Pt_5Ta_4/CrMo_{10}/Ti$ media.

Example 7

Magnetic Disk Device Using Magnetic Recording Medium of Invention.

Figure 30:
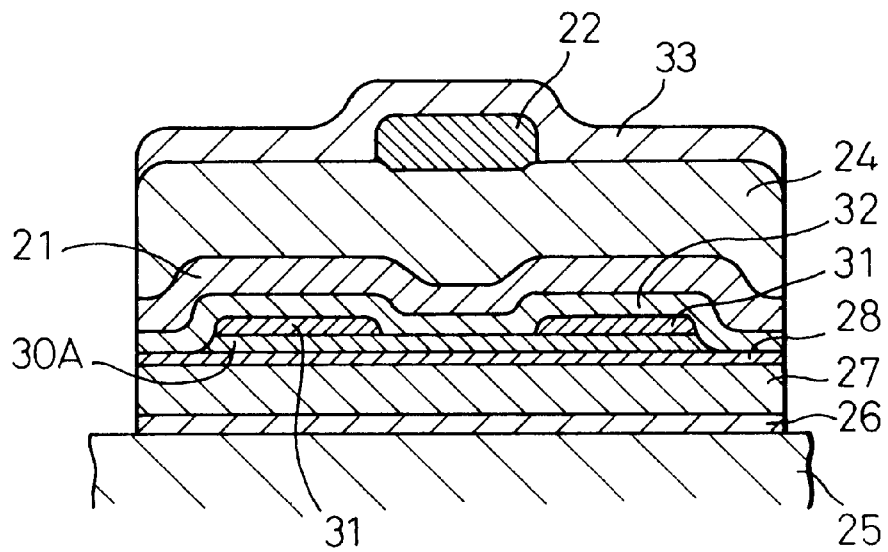
FIG. 30 is a cross-sectional view showing one preferred example of the magnetoresistive head in the magnetic disk device according to the present invention.
Figure 31:
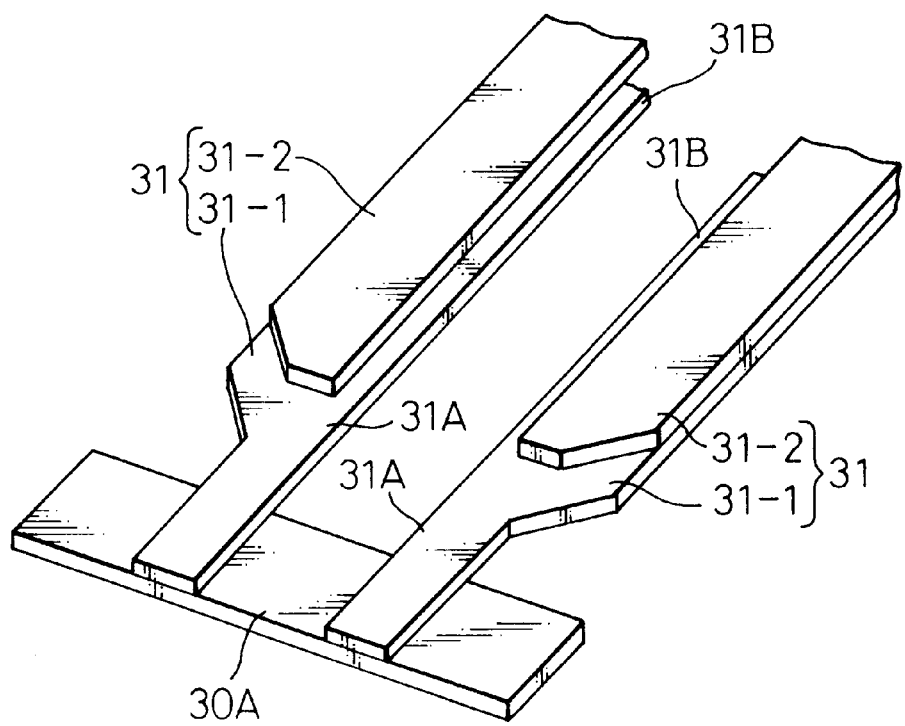
FIG. 31 is a cross-sectional view showing a magnetoresistor section and a conductor layer in the magnetoresistive head of the magnetic disk device according to the present invention.

FIG. 30 is a cross-sectional view of one embodiment of the magnetic disk device (MR head) according to the present invention, and FIG. 31 is a perspective view of a magnetoresistor section and a conductor layer in the MR head shown in FIG. 30 noted above. FIG. 30 corresponds to FIG. 1. This embodiment is different from the embodiment shown in FIG. 1 in the construction of the conductor layer 31 section and the construction associated with the conductor layer 31 section. Specifically, in the present embodiment, the thickness of the conductor layer 31 is small in its portion 31A in the vicinity of the magnetoresistor section 30A (for example, not more than 1200 Å; the smaller the thickness, the better the results) with the thickness of the other portion 31B being large (for example, 3000–4000 Å or 2 to 4 times larger than the thickness of the portion 31A in the vicinity of the magnetoresistor section 30A).

The adoption of a multi-layer structure in the conductor layer 31 is effective for the formation of the portion 31B, other than the portion in the vicinity of the magnetoresistor section 30A, at a large thickness. In the present embodiment, as shown in FIG. 31, the conductor layer 31 has a two-layer structure. The first layer 31-1 (for example, thickness not more than 1200 Å) is first formed, and the second layer 31-2 (for example, thickness 1800–2200 Å) is then laminated on only the portion 31B of the first layer 31-1.

In the present embodiment, the operation of recording/reproduction of information is quite the same as that in the prior art. Specifically, when information is recorded on the magnetic recording medium, a current is allowed to flow through the coil in the recording head section to create a magnetic flux in the magnetic poles 21, 22. This results in the creation of a leakage magnetic flux in the recording gap portion of the magnetic poles 21, 22 to conduct recording of information on the magnetic recording medium.

On the other hand, reading of information from the magnetic recording medium is performed by taking advantage of a difference in electric resistance of the magnetoresistor section 30A between the case where an external magnetic field is applied from the magnetic recording medium and the case where no external magnetic field is applied from the magnetic recording medium. Specifically, a change in resistance in the magnetoresistor section 30A is detected through the conductor layers 31-1 and 31-2, and the magnetic head outputs the change in resistance as a reproducing signal.

In the present embodiment, since the thickness of the conductor layer 31 is small in the portion 31A in the vicinity of the magnetoresistor section 30A, the curving of the lower magnetic pole (upper shield layer) 21 and the like is small. By virtue of this, the recording gap facing the magnetic recording medium is also not significantly deformed. Therefore, even though the position, on a track, of the magnetic head at the time of information recording is somewhat different from the position, on the track, of the magnetic recording at the time of reading of the information, the magnetic disk device can accurately read information, making it possible to avoid a problem that reading errors occur despite a small off-track.

On the other hand, since the thickness and width of the conductor layer 31 is large in the portion 31B other than that in the vicinity of the magnetoresistor section 30A, the resistance of the whole conductor layer 31 can be reduced. For example, the resistance about 10Ω in the prior art can be easily reduced to 7 to 8Ω. As a result, a change in resistance of the magnetoresistor section 30A can be detected with a high sensitivity, resulting in improved S/N ratio. Further, generation of heat in the conductor layer 31 can also be avoided, preventing the creation of noise attributable to the generation of heat.

In the above embodiment, the conductor layer 31 in its portion 31B in the vicinity of the magnetoresistor section 30A is formed in large thickness and width. Alternatively, in the portion 31B, only the thickness may be increased without increasing the width. Further, the position of the connection of the conductor layer 31 is not limited to the position shown in FIG. 31 and may be any position so far as a sense current may be allowed to flow in a predetermined direction.

A number of magnetic heads as described above are formed on a ceramic head substrate by the thin film forming method. Thereafter, the head substrate is taken off for each head and worked into a desired shape to provide a slider, provided with a magnetic head, shown in FIG. 32. In the slider shown in FIG. 32, rails 41, 42 for creating a flying force due to an air stream created by the rotation of the magnetic recording medium are provided on the face opposite to the magnetic recording medium of the slider 40. Inclined faces 41a, 42a are formed on the air inflow side of the flying face of the rails 41, 42, and the magnetic head 45 shown in FIG. 30 is provided on the rear end face of the rail 42 in the slider 40.

Figure 32:
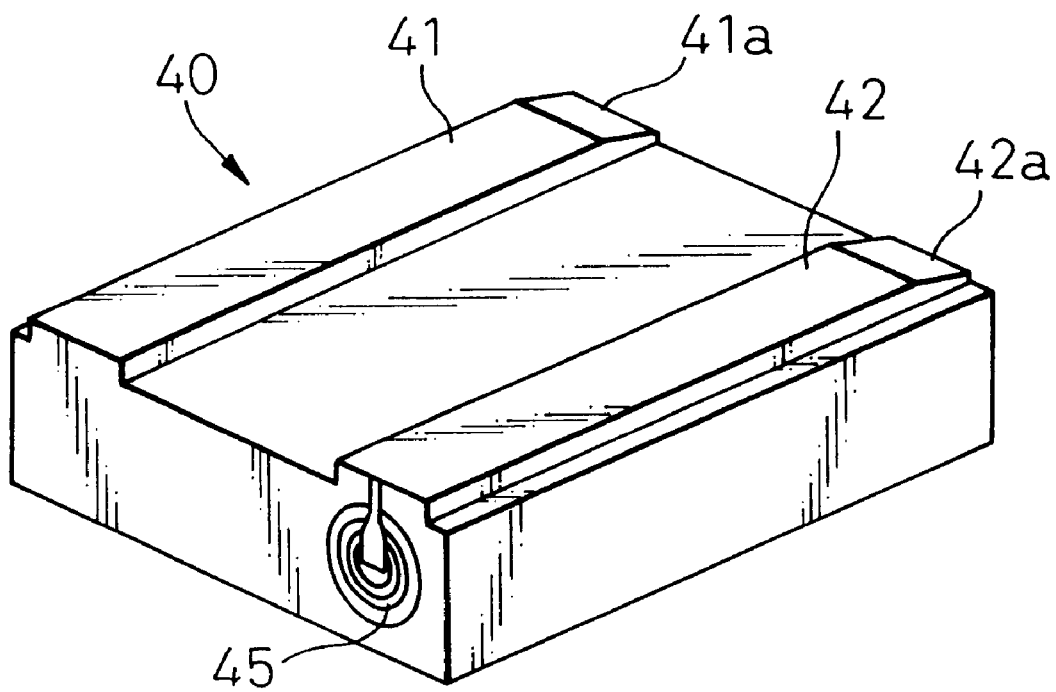
FIG. 32 is an explanatory perspective view of a slider provided with a magnetic head.

The present embodiment of the magnetic disk driving device or drive comprises a magnetic head and a slider shown in FIG. 32. The present embodiment of the magnetic disk device will be described.

Figure 33:
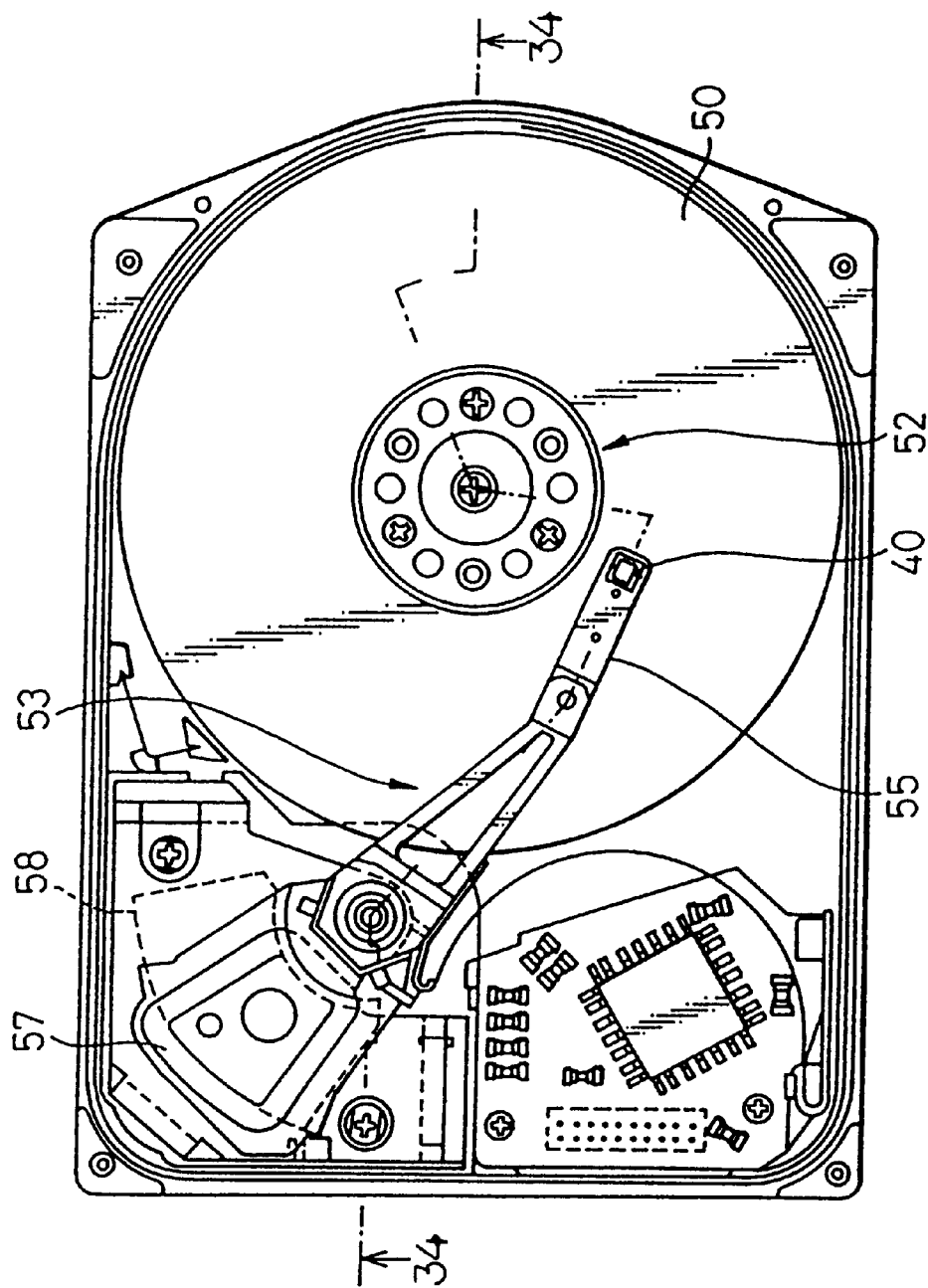
FIG. 33 is a plan view of a magnetic disk drive using the slider shown in FIG. 32.
Figure 34:
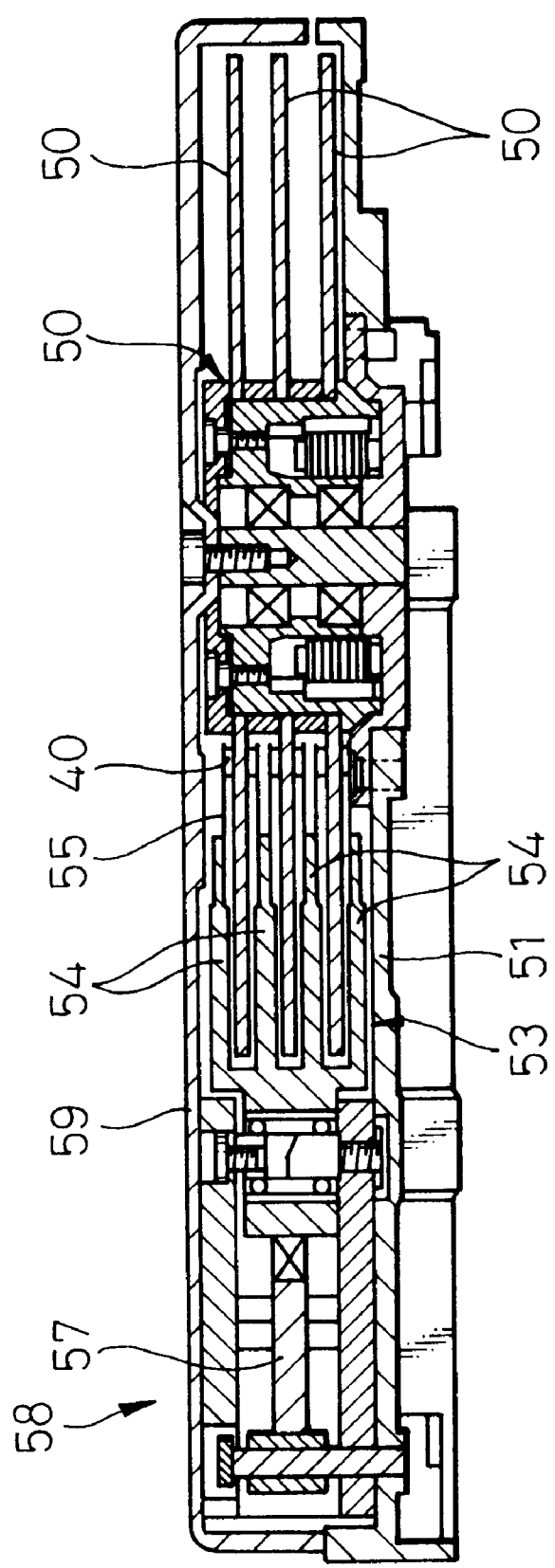
FIG. 34 is a cross-sectional view taken on line A—A of the magnetic disk drive shown in FIG. 33.

FIG. 33 is a plan view of a magnetic disk drive (with a cover removed) using the slider, provided with a magnetic head, shown in FIG. 32, and FIG. 34 is a cross-sectional view taken on line A—A of FIG. 33.

In these drawings, numeral 50 designates a plurality of magnetic disks (3 disks for the present embodiment) as a magnetic recording medium which is rotated and driven by means of a spindle motor 52 provided on a base plate 51.

Numeral 53 designates an actuator rotatably provided on the base plate 51. A plurality of head arms 54, which extend toward the recording face of the magnetic disk 50 are provided on one rotation end of the actuator 53. A spring arm 55 is rotatably mounted on the rotation end of the head arm 54, and, further, the above slider 40 is inclinably mounted through an insulating film (not shown) on the flexure section of the spring arm 55. On the other hand, a coil 57 is provided on the other rotation end of the actuator 53.

A magnetic circuit 58 constituted by a magnet and a yoke is provided on the base plate 51, and the coil 57 is disposed within the magnetic gap of the magnetic circuit 58. The magnetic circuit 58 and the coil 57 constitute a moving coil type linear motor (VCM: voice coil motor). The upper surface of the base plate 51 is covered with a cover 59.

The operation of the magnetic disk device having the above construction will be described. When the magnetic disk 50 is in a stopped state, the slider 40 is in contact with a siding zone and in a stopped state.

When the magnetic disk 50 is rotated and driven at a high speed by means of a spindle motor 52, an air stream created by the rotation of the magnetic disk 50 permits the slider 40 to fly above the disk face while leaving a very small space between the slider and the disk surface. In this state, the flow of a current through the coil 57 creates thrust in the coil 57, rotating the actuator 53. This permits the head (slider 40) to be moved to a desired track of the magnetic disk 50 to conduct reading/wiring of data.

In this MR head, the conductor layer in the head has a small thickness in the vicinity of the magnetoresistor section with the thickness of the other portion being large. This construction reduces the curving of the magnetic pole of the recording head section and, at the same time, lowers the resistance of the conductor layer and, in the case of small off-track, enables information to be read with high accuracy and high sensitivity.

As can be understood from the foregoing description, according to the present invention, an improvement in S/N ratio of the magnetic recording medium over that of the conventional magnetic recording medium, realizing a magnetic disk device having a higher density than the conventional device. Further, the interposition of a Ti thin film between a substrate and a primer layer, particularly a CrMo primer layer, provided on the substrate can provide a magnetic recording medium suitable for high-density recording with high in-plane coercive force and good S/Nm. Other effects of the present invention will be easily understood from the foregoing description.

What is claimed is:

1. A magnetic recording medium for use in a magnetic disk device provided with a magnetoresistive head, said recording medium comprising a nonmagnetic substrate and a magnetic recording film of a magnetic metal material provided through a primer layer of a nonmagnetic metal material on the substrate, wherein the primer layer is formed of a metallic material composed mainly of chromium and molybdenum and the magnetic recording film is formed of a metallic material comprising a four-component alloy having the following composition:

chromium: 14 to 25 at %,
   tantalum: 1 to 7.5 at %,
   platinum: 2 to 20 at %, and
   cobalt: balance; and
   in which the magnetic recording film has a tBr of not more than 120 G.$\mu$m and a thickness of not more than 30 nm, and the primer layer underlying the magnetic recording film has a thickness of not more than 30 nm and the lattice spacing of the (110) plane thereof is about 1% wider than that of the (001) plane of the magnetic recording film as a function of the varied content of molybdenum in the primer layer.

2. The magnetic recording medium according to claim 1, in which the magnetic recording film has been formed by sputtering under the application of a DC negative bias of not less than 200V.

3. The magnetic recording medium according to claim 1 or 2, in which the nonmagnetic substrate is a NiP-plated aluminum disk and the magnetic recording film has been formed from chromium, tantalum, platinum, and cobalt by sputtering at a substrate temperature of 280 to 320° C.

4. The magnetic recording medium according to claim 1 or 2, in which the nonmagnetic substrate is a glass disk and the magnetic recording film has been formed from chromium, tantalum, platinum, and cobalt by sputtering at a substrate temperature of 280 to 400° C.

5. The magnetic recording medium according to claim 1 or 2, in which the nonmagnetic substrate is a silicon disk having a surface oxide film and the magnetic recording film has been formed from chromium, tantalum, platinum, and cobalt by sputtering at a substrate temperature of 280 to 1200° C.

6. The magnetic recording medium according to claim 1 or 2, which further comprises a protective film of carbon.

7. The magnetic recording medium according to claim 1 or 2, which further comprises an additional primer layer interposed between the substrate and the upper primer layer, the additional primer layer being formed of a metallic material composed mainly of titanium.

8. A magnetic recording medium for use in a magnetic disk device provided with a magnetoresistive head, said recording medium comprising a nonmagnetic substrate and a magnetic recording film of a magnetic metal material provided through a primer layer of a nonmagnetic metal material on the substrate, wherein the primer layer has a thickness of less than 30 nm and is formed of a metallic material composed mainly of chromium and molybdenum and the magnetic recording film is formed of a metallic material composed mainly of cobalt and chromium, and is a film having a multi-layer structure comprising two or more mutually separated magnetic layers formed through a nonmagnetic intermediate film interposed between the respective two magnetic layers.

9. The magnetic recording medium according to claim 8, in which the primer layer and the magnetic layer have been formed by sputtering under the application of a negative bias of 100 to 300 V, and the nonmagnetic intermediate layer has been formed by sputtering in the absence of any applied bias.

10. The magnetic recording medium according to claim 8 or 9, in which the primer layer and the intermediate film have substantially the same composition.

11. The magnetic recording medium according to claim 8 or 9, in which the intermediate film is formed of a metallic material composed mainly of chromium and molybdenum, and the magnetic layer constituting the magnetic recording film is formed of a metallic material that also includes platinum.

12. The magnetic recording medium according to claim 11, in which the primer layer formed of a metallic material composed mainly of chromium and molybdenum has a molybdenum content of 10 to 30 at %.

13. The magnetic recording medium according to claim 11, in which the magnetic layers formed of a metallic material composed mainly of cobalt, chromium, and platinum each have a thickness of not more than 15 nm and the total thickness of the magnetic layers is not more than 25 nm.

14. The magnetic recording medium according to claim 11, in which the primer layer formed of a metallic material composed mainly of chromium and molybdenum has a thickness of 1 to 10 nm.

15. The magnetic recording medium according to claim 8 or 9, in which the nonmagnetic substrate is a NiP-plated aluminum disk, and the magnetic layers each have been formed by sputtering at a substrate temperature of 200 to 320° C.

16. The magnetic recording medium according to claim 8 or 9, which further comprises a protective film of carbon.

17. The magnetic recording medium for use in a magnetic disk device provided with a magnetoresistive head, said recording medium according to claim 8 or 9, which further comprises an additional primer layer interposed between the substrate and the upper primer layer, the additional primer layer being formed of a metallic material composed mainly of titanium.

18. A magnetic recording medium for use in a magnetic disk device provided with a magnetoresistive head, said recording medium comprising a nonmagnetic substrate and a magnetic recording film of a magnetic metal material provided through a primer layer of a nonmagnetic metal material on the substrate, wherein the primer layer has a thickness of not more than 30 nm and is formed of an alloy comprising 10 to 30 at % of molybdenum with the balance consisting of chromium, and the magnetic recording film is a film having a multi-layer structure comprising two or more mutually separated magnetic layers formed through a nonmagnetic intermediate film interposed between respective two magnetic layers, the magnetic layers each being formed of a metallic material comprising cobalt and chromium as main components and, as additional components, 4 to 40 at % of platinum and 5 at % or less of at least one member selected from the group consisting of tantalum, and niobium, the total thickness of the magnetic layers being not more than 30 nm.

19. The magnetic recording medium according to claim 18, in which the primer layer and the intermediate film have substantially the same composition and the intermediate layer has a thickness of 1 to 5 nm.

20. The magnetic recording medium according to claim 18 or 19, in which the primer layer, the magnetic layers, and the intermediate layer have been formed by sputtering under the application of a negative bias of 100 to 300 V.

21. The magnetic recording medium according to claim 18 or 19, in which the nonmagnetic substrate is a NiP-plated aluminum disk and the magnetic layers each have been formed by sputtering at a substrate temperature of 200 to 320° C.

22. The magnetic recording medium according to claim 18 or 19, which further comprises a protective film of carbon.

23. The magnetic recording medium according to claim 18 or 19, which further comprises an additional primer layer interposed between the substrate and the overlying upper primer layer, the additional primer layer being formed of a metallic material composed mainly of titanium.

24. A magnetic disk device comprising a recording head section for recording information in a magnetic recording medium and a reproducing head section for reproducing information, wherein the reproducing head section is provided with a magnetoresistive head, and further wherein the magnetic recording medium is a magnetic recording medium comprising a nonmagnetic substrate and a magnetic recording film of a magnetic metal material provided through a primer layer of a nonmagnetic metal material on the substrate, the primer layer is formed of a metallic material composed mainly of chromium and molybdenum and the magnetic recording film is formed of a metallic material comprising a four-component alloy having the following composition:

chromium: 14 to 25 at %, tantalum: 1 to 7.5 at %, platinum: 2 to 20 at %, and cobalt: balance; and in which the magnetic recording film has a tBr of not more than 120 G.μm and a thickness of not more than 30 nm, and the primer layer underlying the magnetic recording film has a thickness of less than 30 nm and the lattice spacing of the (110) plane thereof is about 1% wider than that of the (001) plane of the magnetic recording film as a function of the varied content of molybdenum in the primer layer.

25. The magnetic disk device according to claim 24, in which the magnetoresistive head is an AMR head or a GMR head.

* * * * *

UNITED STATES PATENT AND TRADEMARK OFFICE
CERTIFICATE OF CORRECTION

PATENT NO. : 6,071,607
DATED : June 6, 2000
INVENTOR(S) : Okuyama et al.

It is certified that error appears in the above-identified patent and that said Letters Patent is hereby corrected as shown below:

Column 26,
Lines 64-66, delete "for use in a magnetic disk device provided with a magneto resistive head, said recording medium"

Signed and Sealed this

Sixth Day of November, 2001

*Attest:*

*Nicholas P. Godici*

NICHOLAS P. GODICI
*Attesting Officer*     *Acting Director of the United States Patent and Trademark Office*